US012626261B2

(12) United States Patent
Pascual et al.

(10) Patent No.: US 12,626,261 B2
(45) Date of Patent: May 12, 2026

(54) SYSTEM AND METHOD FOR AUTOMATED SCAM DETECTION

(71) Applicant: Scamnetic Inc., Wesley Chapel, FL (US)

(72) Inventors: Alphonse Pascual, Wesley Chapel, FL (US); John G. Evans, Jr., Sterling, VA (US)

(73) Assignee: Scamnetic Inc., Wesley Chapel, FL (US)

( * ) Notice: Subject to any disclaimer, the term of this patent is extended or adjusted under 35 U.S.C. 154(b) by 0 days.

(21) Appl. No.: 19/201,339

(22) Filed: May 7, 2025

(65) Prior Publication Data
US 2025/0278737 A1 Sep. 4, 2025

Related U.S. Application Data

(63) Continuation-in-part of application No. 18/903,138, filed on Oct. 1, 2024.

(60) Provisional application No. 63/542,069, filed on Oct. 2, 2023.

(51) Int. Cl.
G06Q 20/40 (2012.01)

(52) U.S. Cl.
CPC ................................ G06Q 20/4016 (2013.01)

(58) Field of Classification Search
CPC ...................... G06Q 20/4016; H04L 63/1483
See application file for complete search history.

(56) References Cited

U.S. PATENT DOCUMENTS

| | | | | |
|---|---|---|---|---|
| 11,297,056 B1 * | 4/2022 | Lester | ................... | G06F 21/316 |
| 2009/0089869 A1 * | 4/2009 | Varghese | .............. | G07F 7/1008 |
| | | | | 726/7 |
| 2019/0392162 A1 * | 12/2019 | Stern | ................... | G06F 21/6245 |
| 2020/0076813 A1 * | 3/2020 | Felice-Steele | .......... | H04L 63/18 |
| 2025/0024264 A1 * | 1/2025 | Opedal | ................. | H04W 12/72 |

FOREIGN PATENT DOCUMENTS

JP      2011253499 A  * 12/2011

* cited by examiner

*Primary Examiner* — Fatoumata Traore
*Assistant Examiner* — Carlton Johnson
(74) *Attorney, Agent, or Firm* — Kelley Drye & Warren LLP

(57) ABSTRACT

A system for verifying an identity of a counterparty includes one or more processors and a memory storing instructions that, when executed, cause the system to receive identifying information from a user, transmit a consent prompt to the counterparty via an associated communication channel, receive consent and additional data including a full name and approximate location, determine whether the name is historically associated with the identifying information, analyze whether the identifying information corresponds to a temporary account based on service provider characteristics, correlate a device fingerprint of the counterparty's device with historical records linked to the identifying information, generate a scam risk score based on results of the determining and analyzing operations, and present the scam risk score and one or more risk-based recommendations to the user through a privacy-preserving interface.

18 Claims, 16 Drawing Sheets

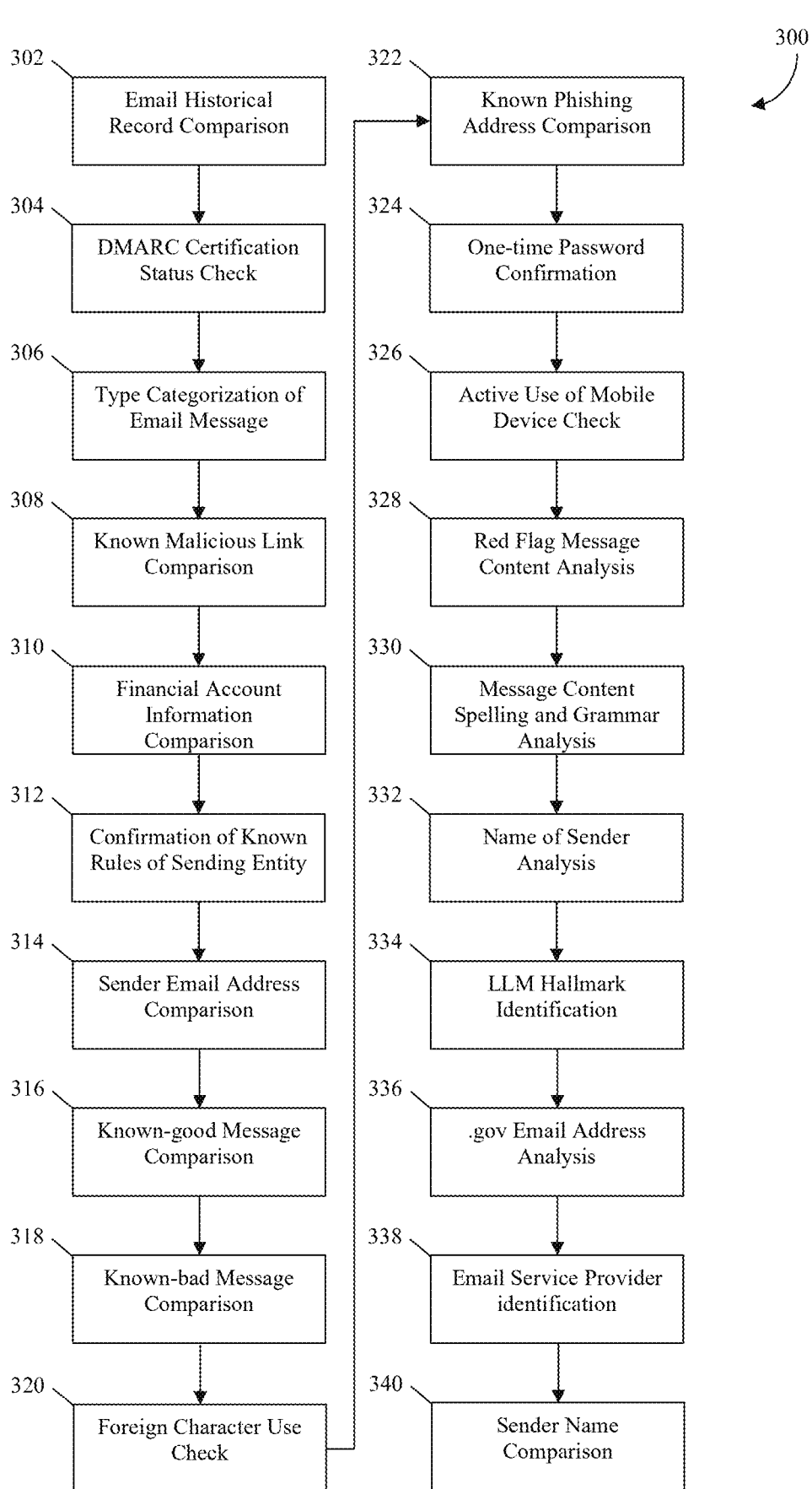

300

302 Email Historical Record Comparison

304 DMARC Certification Status Check

306 Type Categorization of Email Message

308 Known Malicious Link Comparison

310 Financial Account Information Comparison

312 Confirmation of Known Rules of Sending Entity

314 Sender Email Address Comparison

316 Known-good Message Comparison

318 Known-bad Message Comparison

320 Foreign Character Use Check

322 Known Phishing Address Comparison

324 One-time Password Confirmation

326 Active Use of Mobile Device Check

328 Red Flag Message Content Analysis

330 Message Content Spelling and Grammar Analysis

332 Name of Sender Analysis

334 LLM Hallmark Identification

336 .gov Email Address Analysis

338 Email Service Provider identification

340 Sender Name Comparison

FIG. 3

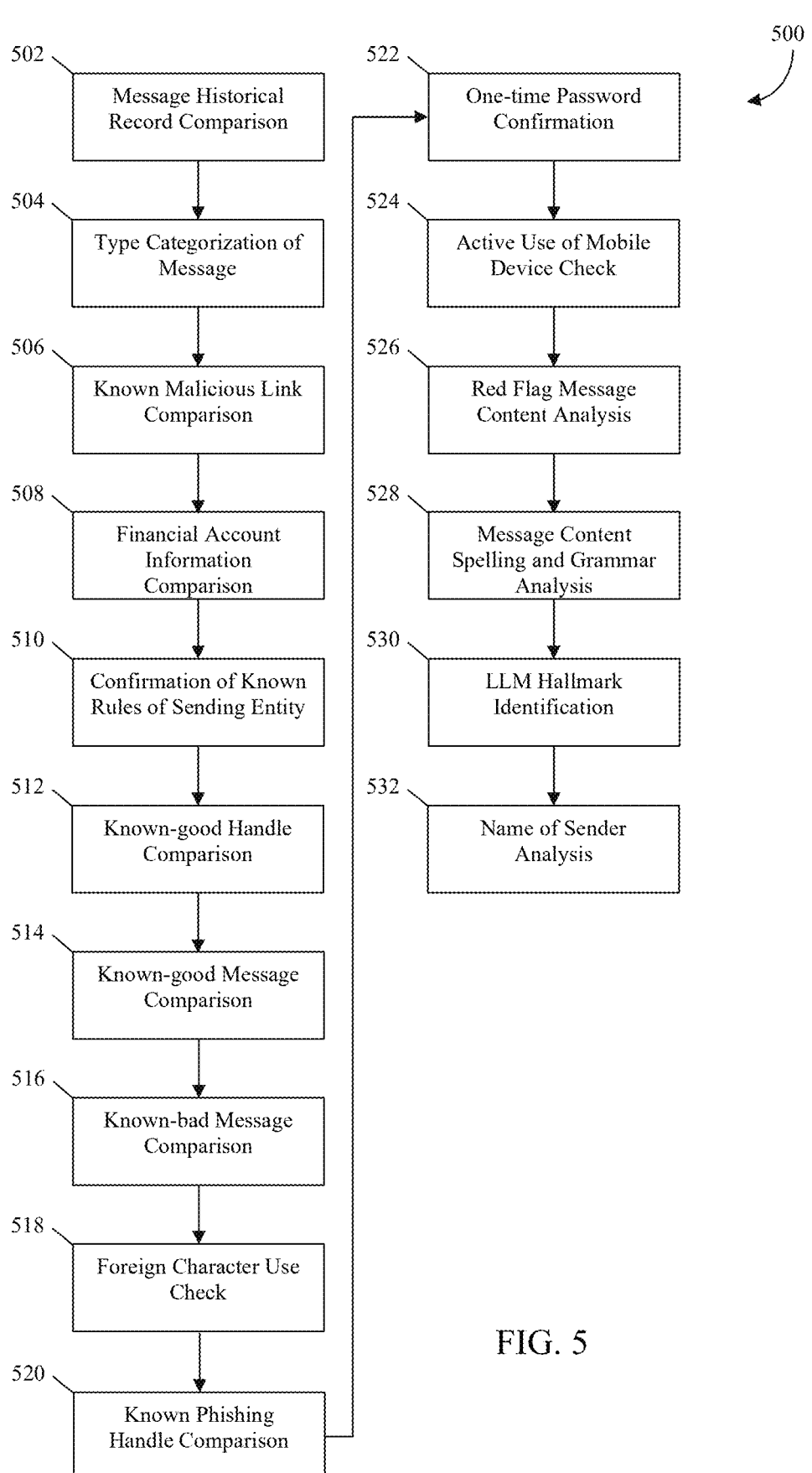

502 — Message Historical Record Comparison

504 — Type Categorization of Message

506 — Known Malicious Link Comparison

508 — Financial Account Information Comparison

510 — Confirmation of Known Rules of Sending Entity

512 — Known-good Handle Comparison

514 — Known-good Message Comparison

516 — Known-bad Message Comparison

518 — Foreign Character Use Check

520 — Known Phishing Handle Comparison

522 — One-time Password Confirmation

524 — Active Use of Mobile Device Check

526 — Red Flag Message Content Analysis

528 — Message Content Spelling and Grammar Analysis

530 — LLM Hallmark Identification

532 — Name of Sender Analysis

602 Photo Historical Record Comparison

604 Reverse Image Search API Analysis

606 Photo Metadata Comparison

608 Online Image Proportion Analysis

610 Deepfake Detection

800

802 — Historical Database
Record Comparison

804 — Computer-generated or
Altered Facial Image
Detection

806 — Audio Content Analysis
Based on Previous
Training Data

808 — Voice Generation or
Manipulation Software
Detection

SYSTEM AND METHOD FOR AUTOMATED SCAM DETECTION

CROSS-REFERENCE TO RELATED APPLICATIONS

This application is a continuation-in-part of U.S. patent application Ser. No. 18/903,138, filed Oct. 1, 2024, the entire contents of which are hereby incorporated by reference herein.

TECHNICAL FIELD

Aspects of the present disclosure generally relate to scam detection, and more particularly, to automated processes for determining the legitimacy of communications and identities.

BACKGROUND

The growing sophistication of scam tactics has rendered existing anti-fraud tools inadequate for effective scam detection and prevention. Traditional anti-fraud solutions are designed primarily to prevent fraudulent activities that involve a criminal impersonating a consumer in order to open a new account or gain unauthorized access to an existing account. In these scenarios, conventional fraud detection tools look for indicators such as mismatched credentials, failed authentication, unfamiliar devices, and other such anomalies.

However, scams have evolved to operate differently. In many situations, a legitimate customer may be the one initiating the transaction, rendering the typical red flags associated with fraud detection obsolete. For example, in a scam scenario, a customer will be using the correct username and password, successfully passing two-factor authentication, and initiating the transaction from their own known device. These factors make it nearly impossible for traditional anti-fraud tools to detect that a scam is taking place because the underlying assumption of such tools is that a bad actor is impersonating the customer.

While consumers may theoretically rely on training, experience, and intuition to recognize scams, the rapidly advancing technology available to scammers puts even the most diligent consumers at a significant disadvantage. Scammers now utilize tools such as artificial intelligence to craft highly convincing messages, as well as deepfake technology that allows them to impersonate trusted individuals in real time. This creates a scenario where even the most vigilant consumer may be unable to distinguish between a legitimate communication and a scam, thereby increasing their vulnerability.

Additionally, conventional technologies for scam detection typically focus on analyzing attachments by assessing their potential to be malicious rather than examining their actual content. These systems commonly measure entropy, look for known malware signatures, or detect other indicators of harmful behavior within the file. However, the systems do not open or read the attachments to analyze the content embedded within, which leaves a significant gap in detecting scams that may be concealed in the text or images of documents like PDFs, Word files, or images.

This situation has led to an urgent need for technological solutions capable of addressing the evolving threat of scams. Current approaches are ill-equipped to combat the level of sophistication employed by modern scammers. Consumers need a solution to aid discernment of whether an inbound communication is fraudulent or legitimate and assist them in identifying when the person the consumer is interacting with is not who they claim to be. Such a solution would empower consumers to avoid inadvertently sharing sensitive information or transferring money to a scammer, addressing a gap in existing fraud prevention tools.

SUMMARY

Techniques described herein are directed to automated systems and processes for determining the legitimacy of communications and identities.

In one embodiment, a system for scam detection and prevention is disclosed, the system including: one or more processors; and a memory storing instructions that, when executed by the one or more processors, cause the system to perform operations comprising: receiving a communication comprising communication information; parsing the received communication information to extract attributes of the communication information; performing a series of deterministic checks on the attributes; performing a series of probabilistic analyses on the attributes, wherein the probabilistic analyses comprise using machine learning models trained on known legitimate communications and known fraudulent communications; aggregating the results of the deterministic checks and probabilistic analyses to generate a scam risk score; generating recommendations specific based on the generated scam risk score, deterministic checks, and probabilistic analyses; and presenting the scam risk score and the recommendations to a user.

In one embodiment, the deterministic checks comprise comparing links in the communication against a database of known phishing and known malware sites.

In one embodiment, the deterministic checks comprise verifying whether the communication conforms to known communication policies published by a purported sender.

In one embodiment, the probabilistic analyses comprise utilizing Natural Language Processing (NLP) to categorize the communication by type.

In one embodiment, the probabilistic analyses include applying a layered, multi-modal machine learning model to the attributes to assesses whether the communication is similar to known scams and categorize the communication by a specific scam type.

In one embodiment, the system further includes analyzing the communication for hallmarks of being generated by a large language model (LLM).

In one embodiment, the deterministic checks comprise opening and reading content of attachments from the communication to detect embedded scam messages.

In one embodiment, the scam risk score is generated by weighting the results of both the deterministic checks and the probabilistic analyses, and wherein the deterministic checks contribute a higher weight to the scam risk score.

In one embodiment, the recommendations comprise blocking the sender, reporting the communication to authorities, and verifying the sender through alternative channels.

In one embodiment, an adverse scan risk score is sent to the user; and the operations performed by the memory further comprise implementing the recommendations according to the adverse scan risk score.

In one embodiment, the results and the recommendations are presented to the user in a privacy-preserving manner, revealing only non-personally identifiable information (non-PII) indicators of risk.

In one embodiment, a method for scam detection and prevention, is disclosed the method including: receiving a communication comprising communication information; parsing the received communication information to extract attributes of the communication information; performing a series of deterministic checks on the attributes; performing a series of probabilistic analyses on the attributes, wherein the probabilistic analyses comprise using machine learning models trained on known legitimate communications and known fraudulent communications; aggregating the results of the deterministic checks and probabilistic analyses to generate a scam risk score; generating recommendations specific based on the generated scam risk score, deterministic checks, and probabilistic analyses; and presenting the scam risk score and the recommendations to a user.

In one embodiment, the deterministic checks comprise comparing links in the communication against a database of known phishing and known malware sites.

In one embodiment, the probabilistic analyses comprise utilizing Natural Language Processing (NLP) to categorize the communication by type.

The method of claim 14, wherein the probabilistic analyses comprise applying a layered, multi-modal machine learning model to the attributes to assesses whether the communication is similar to known scams and categorize the communication by a specific scam type.

In one embodiment, the method further includes analyzing the communication for hallmarks of being generated by a large language model (LLM).

In one embodiment, the hallmarks comprise atypical word usage, frequency of certain terms, and presence of residual prompts indicative of automated generation.

In one embodiment, the scam risk score is generated by weighting the results of both the deterministic checks and the probabilistic analyses, and wherein the deterministic checks contribute a higher weight to the scam risk score.

In one embodiment, the recommendations comprise blocking the sender, reporting the communication to authorities, and verifying the sender through alternative channels.

In one embodiment, an adverse scan risk score is sent to the user; and the method further comprises implementing the recommendations according to the adverse scan risk score.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other systems and structures for carrying out the same or similar purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further features and advantages, will be better understood from the following description when considered in connection with the accompanying figures. It is to be expressly understood, however, that each of the figures is provided for the purpose of illustration and description only and is not intended as a definition of the limits of the present disclosure.

DESCRIPTION OF DRAWINGS

The features, nature, and advantages of the present disclosure will become more apparent from the detailed description set forth below when taken in conjunction with the drawings, in which:

FIG. 3 illustrates an exemplary flow diagram of a decisioning process for an email communication, according to an aspect of the present invention;

FIG. 5 illustrates an exemplary flow diagram of a decisioning process for a social media message, according to an aspect of the present invention;

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known features may be omitted or simplified in order not to obscure the embodiment being described.

In accordance with aspects described in this specification, a system and associated methods are disclosed for detecting likely scams and advising consumers of the relative risk of various communications based on different attributes including, for example, without limitation, content of the communications, identifiers of the source (e.g., email address, social media account, or telephone number), information about scams and scammers stored in databases, and/or contextual information (e.g., a user's online or phone activity before or around the time of a received communication).

Figure 1:
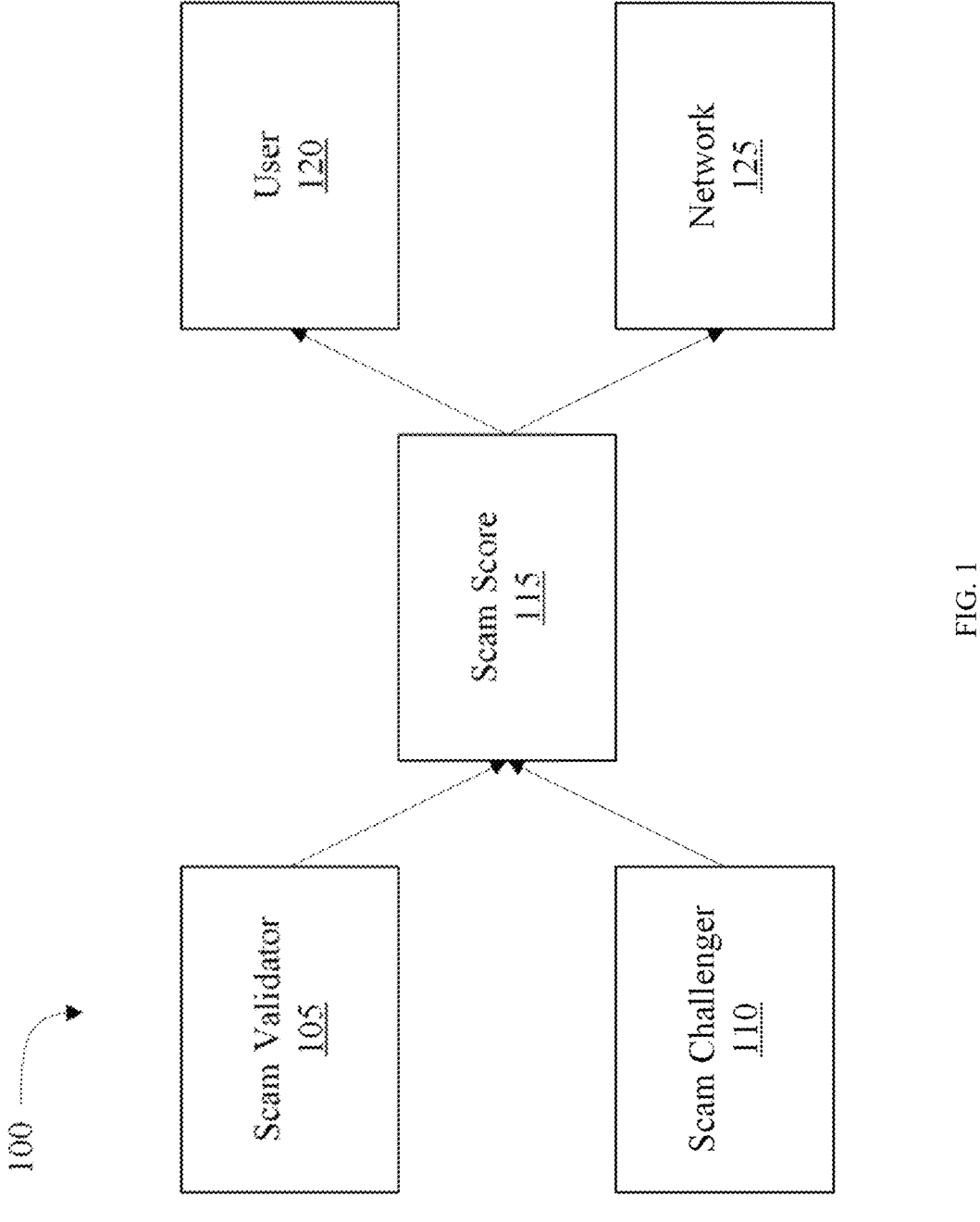
FIG. 1 illustrates an exemplary diagram of a scam detection system, according to an aspect of the present invention.

FIG. 1 illustrates a conceptual diagram of scam detection system 100. Scam detection system 100 may include scam validator subsystem 105 and scam challenger subsystem 110. Scam validator subsystem 105 may be a communication analysis tool configured to accept input from a user regarding a potential scammer and ascertain whether the request or other communication from the input is legitimate. Scam challenger subsystem 110 may be an identity analysis tool configured to initiate an outbound process through which system 100 presents a challenge to a potential scammer to establish legitimacy of the potential scammer. Analysis of the information received from the potential scammer during the validation and challenge processes may be used to generate scam score 115, which represents a risk level associated with a received communication or an identity of the potential scammer. In one embodiment, scam score 115 may be generated from a combined analysis of the validation and challenge processes. In another embodiment, scam score 115 may be generated for each process independently or partially dependent on the results of the other process. Scam score 115 may be presented to user 120 who submitted a validation request or initiated a challenge. In addition, scam score 115 may be shared with network 125 of client organizations who may access data for preventing scams. In addition to scam score 115, data relating to factors that contributed to the score may also be presented and shared.

Scam validator subsystem 105 is configured to analyze a variety of communication types (e.g., email messages, text messages, social media messages, photo images, phone numbers, etc.). Scam validator subsystem 105 may deconstruct various attributes of the input communication so as to establish the likelihood that the communication is related to a scam. This may be achieved by identifying so-called 'indicators of legitimacy' or 'indicators of deception' among the attributes of any communication. Validator subsystem 105 may utilize a decisioning process designed to maximize efficiency (e.g., speed) without sacrificing accuracy or explainability, generating a scam score 115 and a set of recommendations specific to each piece of content submitted by an individual user.

The decisioning process is designed to analyze components of a communication, which may differ depending on the type of communication. For example, emails submitted to the validator subsystem 105 may be run through the decisioning process using operations that are suitable for analyzing potential scams in email communications and depending on the attributes and data contained in the emails.

Figure 2:
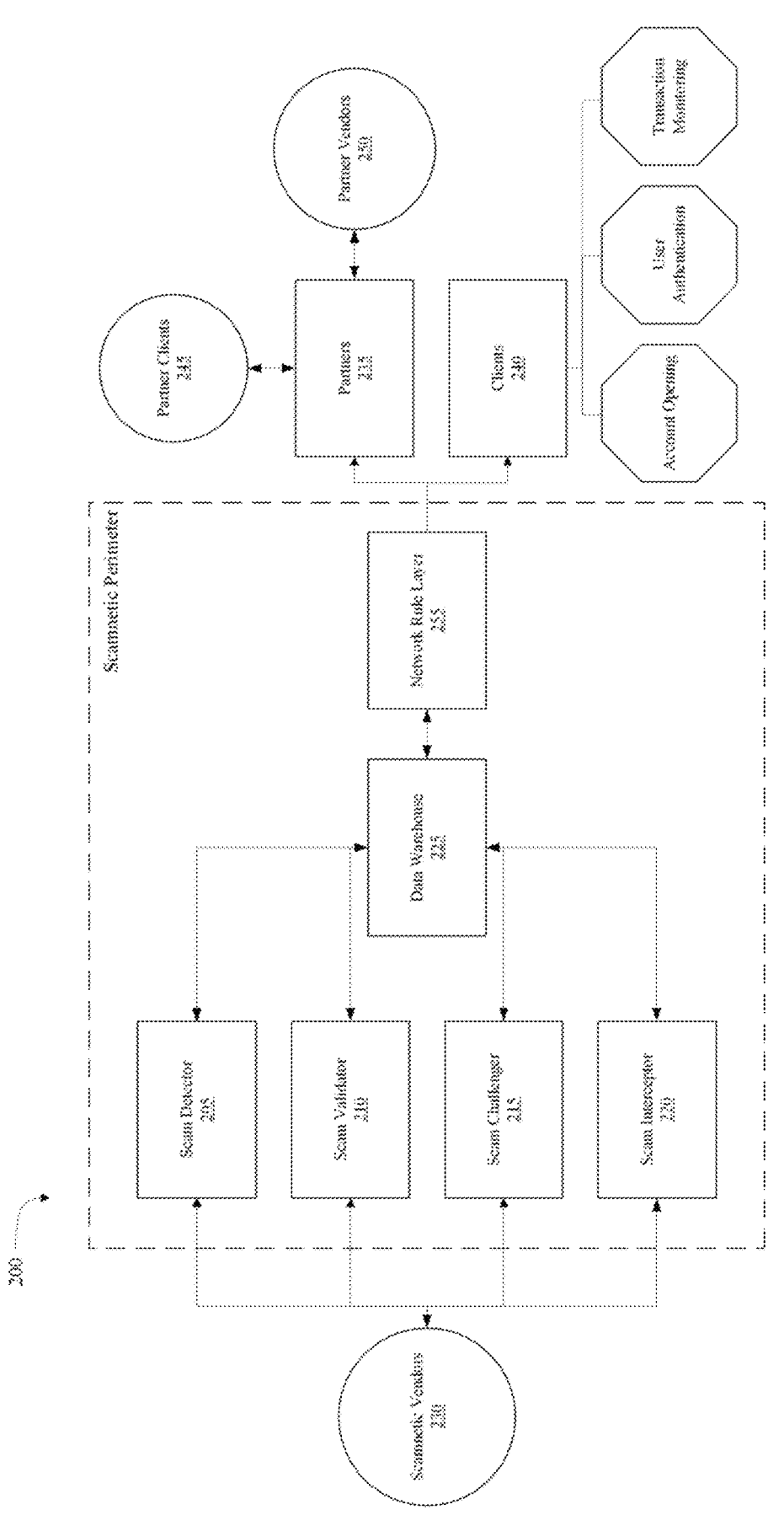
FIG. 2 illustrates an exemplary data flow diagram of a scam monitoring system, according to an aspect of the present invention.

FIG. 2 is a data flow diagram of scam monitoring system 200 and external entities and systems. Scam monitoring system 200 (represented by the "Scamnetic Perimeter") may include scam detector subsystem 205, validator subsystem 210, challenger subsystem 215, scam interceptor subsystem 220, and data warehouse 225. Validator subsystem 210 and challenger subsystem 215 may communicate with one another and may submit queries and storage submissions to data warehouse 225. Scam detector subsystem 205 and scam interceptor subsystem 220 may also retrieve data from data warehouse 225. Scam detector subsystem 205, validator subsystem 210, challenger subsystem 215, and scam interceptor subsystem 220 may interface with vendors 230 to exchange data (e.g., sending requests and receiving responses) through Application Programing Interfaces (APIs) or custom integration. Access to (or forwarding of) data in the data warehouse 225 and population of data in the data warehouse 225 between system 200, partners 235, and clients 240 may be conducted through network rule layer 255, which may apply rules for what user data is permitted to be shared with partners 235 and APIs. Partners 235 may include partner clients 245 and partner vendors 250. Clients 240 may access data warehouse 225 to, for example, without limitation, perform account opening (e.g., with identity verification and/or Know Your Customer (KYC) authentication), user authentication, and transaction monitoring. Clients 240 may also choose to share results with trusted third parties, such as family members and caregivers. In this case, client 240 may enter the contact information (e.g., email address) of the trusted party for subsequent notification during a qualifying event, such as a validation or challenge process that has determined that a scam was attempted or false identity was discovered. Each of partners 235, clients 240, partner clients 245 and partner vendors 250 may represent a network or user device through which the actual users interface with the system.

Scam detector subsystem 205 may include an Autoscan functionality or module that may support automated detection of scams using email and/or browser plug-ins. In particular, to help reduce the burden on users needing to manually submit information, one or more plug-ins may be designed to detect scam attempts as they are received. For example, without limitation, an email plug-in may parse text on one or more emails and launch an interstitial/pop-up to advise the user when malicious activity is detected. To accomplish this function, the plug-in may automatically forward email data to scam detector subsystem 205, which may use a historical database for the email address, known bad message templates, malicious link identification, and other tools leveraged by the validator subsystem 210. This process may pair with phone use detection when a one time passcode (OTP) is found in the email to identify OTP-intercept scams.

Users may set provisions using the plug-in to determine a final disposition of any email based on the score generated by the application. For example, emails scored as extreme risk may automatically be deleted, emails scored as high risk may be automatically sent to a separate folder in their email account, etc. Alternatively, the user may provide the application with permissions through a shared authentication protocol (such as OAuth) allowing for automatic monitoring of their email (or similar) account without the need for a separate plug-in. A browser plug-in may similarly interface with scam detector subsystem 205 to scan a browser address before a user is directed to the page and redirect the user to an intermediate page that describes any malicious intent. Phishing addresses may be identified by referencing the historical database in the data warehouse 225 and third-party phishing site lists, which may be accessed, for example, from vendors 230. Once on a website, the plug-in may parse text on the page to work with browser-based emails that do not support plug-ins, social media activity, and phishing pages not initially detected by the browser address alone.

Scam detector subsystem 205 may further include a scam transaction observer functionality or module that may utilize integration with the user's financial accounts to detect transaction activity associated with a potential scam. This functionality is enabled using, for example, without limitation, authenticated access as provided by the user, through a third-party API, or aggregator with access to the user's financial accounts. The user's payment activity may be analyzed based on the user's historical payment patterns to identify anomalies indicative of a payment to a scammer. This may be determined when the payment involves a payment amount and channel (e.g., wire, person-to-person, etc.) typical of a scam transaction, but unusual for the user. An out of pattern payment may also be identified based on the time at which it is initiated or based on the payment recipient when the information is available for comparison with historical records of known bad recipients. Upon detection of a potential scam payment, the user may be prompted to identify the communications and identities associated with the payment recipient that have previously been assessed by the application. The user may be presented with a series of questions to ascertain the purpose and legitimacy of the payment. For example, questions may include whether the user has met this person in the last 30 days, if the payment is for an investment, or if the user is in a romantic relationship with the recipient. If the user responds in the affirmative to these questions, their financial institution may be notified if the financial institution is a participant in the network (i.e., a partner 235).

Scam detector subsystem 205 may further include a scam monitor functionality or module, which may be implemented in software designed to capture keystrokes on the user's digital devices (e.g., smartphone, tablet, personal computer, etc.). The words typed by the user may be correlated with incoming communications captured by the application to associate the contents of the same correspondence. This combination of data is then analyzed and compared with a database of historical communications in the data warehouse 225 to determine if the user is corresponding with a scammer. Natural Language Processing (NLP) may be used, where scam detector subsystem 205 may be trained with known scam communications and used to detect responses and conversations showing malicious intent within a specific channel (text, email, etc.).

Scam detector subsystem 205 may also be configured to actively open and read the content of attachments, such as images, PDFs, and Word documents, to detect embedded scam messages. Using advanced Natural Language Processing (NLP) and Machine Learning (ML) techniques, scam detector subsystem 205 is configured to thoroughly analyze textual and visual content within attached files, identifying deceptive language, fraudulent offers, or other hidden red flags. By doing so, scam detector subsystem 205 extends the scope of scam detection beyond the body of emails or text messages, ensuring that even sophisticated scams, where criminals embed their malicious content within attachments, are effectively identified and flagged.

Scam interceptor subsystem 220 may be an LLM-based agent that, upon activation, is configured to act on behalf of the user—automatically engaging with potential scammers with to wear down attackers and reduce an incentive to target the user in the future. Scam interceptor subsystem 220 may be based on an open-source LLM that runs on the system infrastructure. Scam interceptor subsystem 220 may be trained on known good and known bad interactions, along with red flag terminology. Data relating to categories of scams, including the expected data to be exchanged, anticipated actions of malicious parties and victims, and the like, may be included as part of the training data. Scam interceptor subsystem 220 may transcribe interactions for future training, as allowed by law. Scam interceptor subsystem 220 may intercept messages automatically when identified by, for example, scam detector subsystem 205. Scam interceptor subsystem 220 may be directed to act in place of the user at any time (e.g., when using the validator subsystem 210, challenger subsystem 215, etc.). The scam interceptor subsystem 220 may take on the name and other identifying characteristics of the user, including voice and face. The user may enroll biometric information (e.g., one or more facial images/scans, voice print, etc.) or the biometric information may be gleaned from user authentication procedures and utilized to train scam interceptor subsystem 220 in representing identifying characteristics of the user. Scam interceptor subsystem 220 may shift communication channels as directed by potential scammers to maintain the illusion of an actual interaction. Additionally, scam interceptor subsystem 220 may elicit as much information as possible from potential scammers to sort out and redirect good requests, and to collect information for the network of client organizations to utilize in the future (e.g., names, phone numbers, email addresses, destination accounts, etc.). Scam interceptor subsystem 220 may be trained on the normal course of conversations typical of scam communications and respond to a scam communication as a scammer would expect. Predetermined data types (e.g., phone number, email, financial account information, etc.) may be extracted and stored from the conversation for future reference. Scam interceptor subsystem 220 may also elicit information from the potential scammer to obtain the predetermined data types or other information that may be used in future scam identification.

Another use for Large Language Models (LLM) within system 200 is for identifying new scam methodologies and communications. The approach for identification involves the use of commercially-available LLMs trained on publicly-available data. For the purpose of this application, the LLMs may leverage the model's ability to glean data from, for example, without limitation, criminal forums on the open web, deep web, dark web (reports from researchers), Telegram (upon LLM availability), etc. to collect evidence of new services, discussions of successful schemes, etc.; social media to collect consumer complaints and queries involving potential scams, both professional and personal; industry news specific to sectors known for scam-related activity, including financial services, employment/HR, and government to identify reports of scam incidents, trends, investigations, etc.; mainstream media to identify macro/national trends, as well as incidents affecting individuals and business as reported on a local level; non-profit organizations to identify reports on trends and specific incidents, which may also include any content generated specifically related to scam victimization; and government benefit programs (press releases) which may include reports on scams, as well as new programs that could become likely targets for scams (even when none are yet reported).

In some implementations, system 200 may also include functionality to enable sampling of communications without relying solely on users to submit communications. Collection of known-good and known-bad messages may be used for generating data used by validator subsystem 210. The ability to collect real-world examples at scale may benefit from automation. As such, system 200 may deploy "scam honeypots" comprised of email accounts and VoIP phone accounts that are hosted/deployed on system servers for receiving such messages. These accounts may be established using fictious identities, and the associated contact information (i.e., email addresses and phone numbers, respectively) may be submitted in forms at marketing sites across the Internet, in compliance with applicable laws, regulations, and user agreements. The submitted information may become part of larger marketing lists that are naturally resold and compromised or otherwise accessed by scammers for targeting and subsequently messaging victims. Messages received by these honeypots are routed through the validator subsystem API via integration with the respective applications, scored, and stored as appropriate (i.e., known-good or known-bad messages).

The collection of known-good and known-bad messages may also be composed of real-world examples, as well as newly generated content to anticipate messages yet to be sampled in data collection. For example, the collection of known-good messages may include real-world examples, such as messages sourced manually (e.g., by the operator of the system 200), from Scam Honeypots, and from the system application in cases where a submission is deemed "low risk." The collection of known-bad messages may include real-world examples, such as messages sourced manually by system 200, from Scam Honeypots, and from the system application in cases where a submission is deemed "extreme risk." Large Language Model-generated examples may include the use of LLMs specifically geared/able to generate such content (e.g., FraudGPT). These examples may or may not yet be in use by scammers, but it may be reasonably surmised that so long as they are generated with a focus on known modus operandi that such examples may be used to target victims. Message disposition (good vs. bad) may permanently change to 'neutral' when the same message is found in examples of situations where the intent was malicious in one example and good in another.

In some implementations, scam validator subsystem 210 may implement a method of analyzing a message or contact information submitted by a user to determine the risk of a scam being perpetrated. The information may be submitted via an application and delivered across a computer network. Upon receiving the information, attributes of the submission may be broken down into discreet components, after which a decisioning process may be applied to the analysis of each attribute in a predetermined order. This analysis compares the attributes with historical databases or otherwise attempts to identify anomalies indicative of scams. The decisioning process may generate a scam risk score based on the analysis, which may be provided to the user. The user may also be provided with a list of reasons for the resulting score based on the analysis of any attributes. Furthermore, risk-avoidance recommendations may be provided to the user, based on the scam risk score and the analysis of any attributes.

In some implementations, scam challenger subsystem 215 may implement a method for establishing the identity of a consumer identity by another consumer user to establish the risk of a scam being perpetrated. The process may be initiated by the user in which the user provides the phone number or email address of another consumer. The receiving consumer may be given the choice to participate in the validation process, allowing or disallowing comparison of their self-provided personal information with that available through third-party records and other historical databases. The process is terminated, and an adverse risk score is generated if the recipient declines participation. Otherwise, the process continues and a decisioning process is applied whereby the submitted personal information is broken down into discreet components. Those components, or attributes, may be compared with third-party records and historical databases. The decisioning process may render a scam risk score based on the analysis, which is provided to the user. The user may also be provided with the personal information submitted by the recipient and the results of analyzing the attributes. Furthermore, risk-avoidance recommendations may be provided to the user, based on the scam risk score and the analysis of any attributes.

In some implementations, the scam score may be generated through a method for rendering a risk score based on the analysis of message or identity attributes. Attributes may be compared with historical databases or otherwise analyzed for anomalies, and the comparison may occur in a predetermined order. The analysis of those attributes may be an attempt to identify legitimacy or deception. These scores may be rendered for receipt by the user, specific to each submission.

In some implementations, system 200 may be used for collecting and disseminating data on adverse events (scams) to and from external parties. Attribute data may be collected from each submission made by users attempting to verify a message or identity when that submission is deemed to be of the highest risk. Attribute data may also be submitted by external parties. The data may be stored in an internal database of data warehouse 225 and may be categorized based on the database structure. Dissemination of that data may be made upon request by internal applications and external parties. Requests may be made via a user interface or an application programming interface. Availability of requested data may be a function of predetermined eligibility rules specific to the type of requestor.

In some implementations, scam detector subsystem 205 may be a computer program that collects and analyzes a user's communications using software that is integrated into the email system, server or application accessed by the user. This software scans the contents of incoming emails. Upon scanning every email, the content of such emails may be initially broken down into various components including the sender email address, the subject line, and the body of the email. Each component may be analyzed such that the component is compared with internal and external databases, or otherwise attempts are made to detect anomalies to establish legitimacy or malicious intent. Alternatively, software may be integrated into a browser application. This software may scan the components of each website visited by the user, including the address of websites and the contents of those sites. Each component is analyzed such that it is compared with internal and external databases, or otherwise attempt to detect anomalies to establish legitimacy or malicious intent.

In some implementations, the scam interceptor subsystem 220 is a computer program that uses artificial intelligence to act as an agent on behalf of the user. The program is trained on known scam methods, language, and events. When a potential scam is submitted and confirmed, or when otherwise activated by the user, the agent subsequently engages with the counterparty. The program may engage with the counterparty by phone, email, text, social media, video or other communications channel. The program adopts the identity and identifying characteristics of the user, including writing style, voice, and visage. The program references the content of any past communications from the counterparty to the user to extract details for use in conversation with the counterparty. These details are considered in the context of the program's training data. The program subsequently engages the counterparty in communications with the goal of ascertaining the motivation of the counterparty, collecting information for use in engagements by other users, and to otherwise continue the conversation until the counterparty chooses to end the conversation with the agent rather than continue.

In some implementations, the scam honeypot functionality may utilize an automated method for collecting messages, such that the messages are collected from communication services including email accounts and voice-over-IP (or other) telephone accounts using accounts hosted on a network of system 200. The communication accounts may be established using fictitious identities. Contact information may be submitted frequently across a diversity of online websites such that the contact information is aggregated with other information submitted by individuals and may become available on marketing lists. These marketing lists may be sold to, compromised by, or otherwise provided to scammers for use in targeting message recipients. Messages received into these accounts may be routed through the network to validator subsystem 210, where the messages may be analyzed through comparison with internal databases (e.g., in the data warehouse 225) and external databases (e.g., hosted by vendors 230), or otherwise examined for anomalies to determine if the messages are legitimate or malicious. These messages may be subsequently saved alongside the findings (disposition) from the analysis for future use in establishing the disposition of future messages.

The functionality of system 200 may be distributed between software that resides on system servers and software or plug-ins that reside on user devices. Similarly, the functionality of the subsystems, in some cases, may be distributed between software that resides on the system servers and software or plug-ins that reside on user devices. For example, without limitation, software on the system servers may perform a majority of the functions of scam detector subsystem 205, validator subsystem 210, challenger subsystem 215, and scam interceptor subsystem 220, while the software and plug-ins on the user device include functionality for receiving input (e.g., user preference settings, and data extracted from received messages), sending data to the system servers, and displaying information (e.g., scam scores and results of analyses) received from the system servers. In some implementations, application software residing on the user device may perform at least some analysis based, for example, on software code and data stored locally on the user device (e.g., that is downloaded from data warehouse 225). In other implementations, the user device may not include separate app software apart from the plug-in. Rather, all of the functions performed on the user device may be handled by the plug-ins.

FIG. 3 is a flow diagram of an exemplary decisioning process 300 for an email communication. The email communication may be compared with historical records of previously decisioned malicious activity (e.g., stored in the system databases) at 302. This comparison allows the system to detect patterns or anomalies that align with known scam or fraud attempts, enabling a more informed and proactive decision-making process regarding the legitimacy of the communication. A Domain-based Message Authentication, reporting, and Conformance (DMARC) certification status check is performed on the email communication at 304. The DMARC certification status check may be used route the email communication for subsequent checks within process 300. The email content is analyzed to categorize the message by type (e.g., ecommerce, gift card, romance, shipping, etc.) at 306. Included links may be compared with a database of known malicious links (e.g., phishing, malware) at 308. Included financial account information (e.g., routing and account numbers, cryptocurrency wallet addresses, etc.) may be compared with a database of accounts used in the commission of a scam at 310. A confirmation of whether the email conforms to known rules for the purported sending entity is performed at 312. Many organizations, such as banks or merchants, publish guidelines that define how they will or will not engage with their customers through various channels. For example, a bank may inform customers via their website or educational campaigns that it will never request sensitive information, such as passwords or social security numbers, via text message. Similarly, a merchant may specify that order-related updates will only be sent through their mobile app, not via email or text. The system may incorporate these rules by capturing and storing communication policies from numerous organizations, allowing the system to automatically recognize whether the message conforms to the stated rules for the alleged sender. If the message does not align with the organization's communication practices, the system may alert the user, eliminating the need for the user to rely solely on memory to determine whether the message is legitimate or suspicious. The email address of the sender may be compared with a list of known-good email addresses at 314. The email message may be compared with examples of known-good messages at 316. The email message may be compared with examples of known-bad messages at 318. Use of any foreign characters in the sender's email address or subject line may be identified at 320. The email address may be compared with a list of known phishing addresses at 322. A determination may be made whether the email recipient also received a one-time password within the message or via text (e.g., using an app installed on the user device) at 324. A determination may be made whether the email recipient is actively using their mobile device for a phone call (e.g., using the app) at 326. Message content may be analyzed for red flag terminology (e.g., stored in the system databases) at 328. Message content may be analyzed for spelling and grammar issues at 330. A determination may be made if the name of the sender identified in the message is also shown in the email address at 332. Hallmarks that identify the message as being generated by a large language model (LLM) are detected at 334. These hallmarks may include unusual patterns in word usage, such as the atypical frequency of certain words or phrases that differ from normal human communication. For example, LLM-generated content may overuse certain formal or technical terms or exhibit a lack of natural linguistic variation. Another common Hallmark may be the use of structured formats, such as bulleted or numbered lists, which are often employed by LLMs to organize information. Additionally, LLM-generated content may include residual prompts or questions intended for user interaction, which may inadvertently remain in the message when shared with a third party. For example, without limitation, a phrase like "Is there something else I can help you with?" may be a clear indicator that the message may have originated from an automated system rather than a human. By identifying these and other subtle markers, the system may flag communications that appear to be artificially generated, adding another layer of analysis to help users discern whether the message is legitimate or part of a scam. An identification of whether the email was sent from a .gov address is made at 336. An identification of whether the recipient account is hosted by specific email service providers (e.g., which may be associated with different levels of user identity validation and/or usage by scammers) is made at 338. A name of the sender from the body of email may be compared with a list of scored sender names at 340. In some implementations and in some situations, not all of the foregoing operations are performed.

Analysis and categorization of message by type of step 306, analysis for red flag terminology of 328, and analysis for spelling and grammar issues at 330 may be implemented using Natural Language Processing (NLP) techniques. This process may involve leveraging machine learning models that have been trained on both known legitimate communications and known scam communications. Initially, a general model may be applied to assess the content against a broad set of known scam patterns, identifying whether the communication resembles any previously flagged fraudulent activity. Following this, a more specialized model may be employed, which is trained using a segmented approach based on different types of scams. By using this multimodal, layered method, the system not only determines if an email is likely a scam, but also identifies the specific type of scam the message may belong to, such as phishing, romance scams, or fake shipping notifications. For example, without limitation, in instances where the email content is flagged as potentially malicious by the general model but the subsequent specialized model cannot categorize the communication under a specific scam type, the system assigns a "Moderate Risk" rating. This layered approach ensures that communications are assessed with nuance, allowing the system to differentiate between a suspicious email that cannot be conclusively categorized and one that exhibits clear hallmarks of a known scam type. By doing so, the system reduces the likelihood of false positives while maintaining a high level of vigilance for potential threats.

Figure 4:
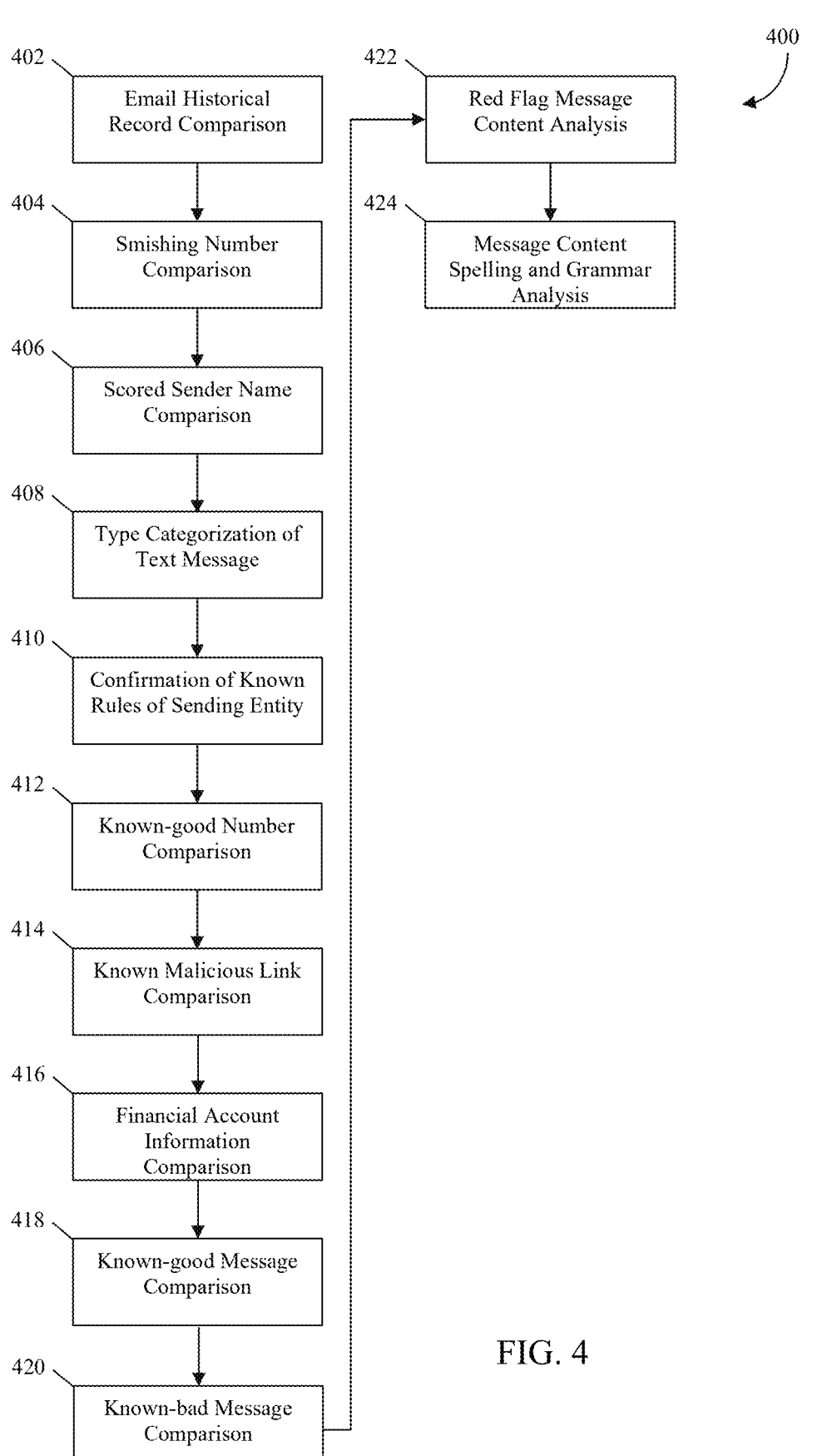
FIG. 4 illustrates an exemplary flow diagram of a decisioning process for a text message communication, according to an aspect of the present invention.

Text messages submitted to the validator subsystem 105 may run through a decisioning process that includes operations that are suitable for analyzing potential scams in text message communications and depending on the attributes and data contained in the text message. FIG. 4 is a flow diagram of decisioning process 400 for a text message communication. The text message may be compared with historical records of previously decisioned malicious activity (e.g., as stored in the system databases) at 402. The originating phone number may be compared with a list of known smishing numbers (e.g., as stored in the system databases) at 404. A name of the sender from the body of the text message may be compared with a list of scored sender names (e.g., as stored in the system databases) at 406. The content of the text message is analyzed to categorize the message by type (e.g., ecommerce, gift card, romance, shipping, etc.) at 408 via NLP as described above. A confirmation may be made whether the text message conforms to known rules for the purported sending entity (e.g., as stored in the system databases) at 410. A phone number of the sender may be compared with a list of known-good phone numbers at 412. Links included in the text message may be compared with a database of known malicious links (e.g., phishing, malware) at 414. Financial account information (e.g., routing and account numbers, cryptocurrency wallet addresses, etc.) included in the text message may be compared with a database of accounts used in the commission of a scam at 416. The text message may be compared with examples of known-good messages at 418. The text message may be compared with examples of known-bad messages at 420. Message content may be analyzed for red flag terminology (e.g., as stored in the system databases) at 422. Message content may be analyzed for spelling and grammar issues at 424. In some implementations and in some situations, not all of the foregoing operations are performed.

Social media messages submitted to a decisioning process that may run through a decisioning process that includes operations that are suitable for analyzing potential scams in social media messages and depending on the attributes and data contained in the social media message. FIG. 5 is a flow diagram of a decisioning process 500 for a social media message. The social media message may be compared with historical records of previously decisioned malicious activity (e.g., as stored in the system databases) at 502. Content may be analyzed to categorize the message by type (e.g., ecommerce, gift card, romance, shipping, etc.) at 504 via NLP. Links included in the social media message may be compared with a database of known malicious links (phishing, malware) (e.g., as stored in the system databases) at 506. Financial account information (e.g., routing and account numbers, cryptocurrency wallet addresses, etc.) included in the social media message may be compared with a database identifying accounts used in the commission of a scam at 508. A confirmation may be made whether the social media message conforms to known rules for the purported sending entity (e.g., as stored in the system databases) at 510. A social media handle of sender may be compared with a list of known-good handles at 512. The social media message may be compared with examples of known-good messages at 514. The social media message may be compared with examples of known-bad messages at 516. Use of any foreign characters in the sender's email address or subject line may be identified at 518. The social media handle may be compared with a list of known phishing handles at 520. A determination may be made whether the message recipient also received a one-time password within the message or via text (using an app installed on the user device) at 522. A determination may be made whether the message recipient is actively using their mobile device for a phone call (using the app) at 524. Message content may be analyzed for red flag terminology at 526. Message content may be analyzed for spelling and grammar issues at 528. Hallmarks that identify the message as being generated by a large language model may be detected at 530. A name of the sender from the body of the social media message may be compared with a list of scored sender names (e.g., as stored in the system databases) at 532. In some implementations and in some situations, not all of the foregoing operations are performed.

Figure 6:
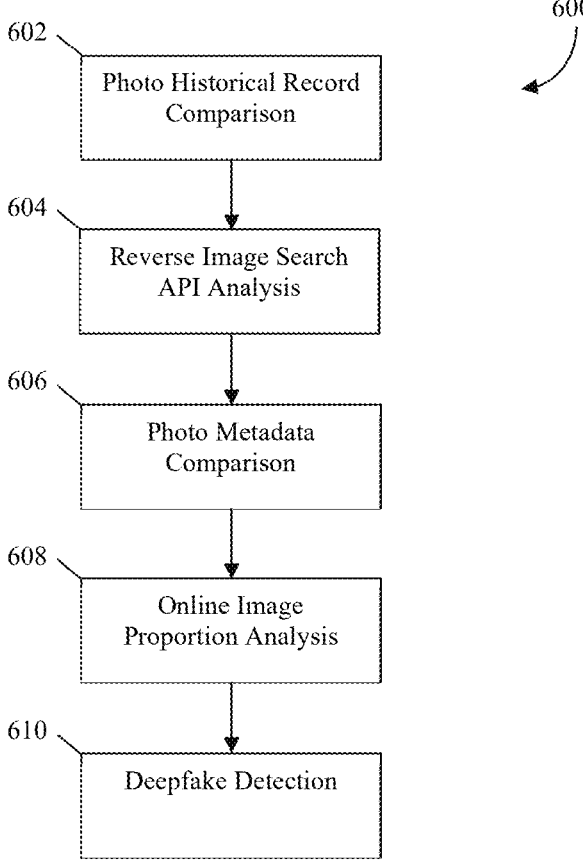
FIG. 6 illustrates an exemplary flow diagram of a decisioning process for a photo, according to an aspect of the present invention.

Photos submitted to the validator subsystem may run through a decisioning process that includes operations that are suitable for analyzing potential scams in photos and depending on the attributes and data related to the photo. FIG. 6 is a flow diagram of a decisioning process 600 for a photo. The photo may be compared with previously submitted photos to determine if the photo is assessed to be an extreme risk at 602. A reverse image search API is used to locate examples of the photo that are available online at 604. In conjunction with this search, the system may analyze the associated metadata of the images found, cross-referencing them with the name or profile information used in the submitted sample. This comparison helps to determine whether the name or profile in the message matches those found elsewhere on the internet. If inconsistencies are identified—such as, for example, the image being associated with multiple names or profiles, particularly on the same platform—this becomes a significant indicator of potential risk. Such discrepancies suggest that the image may have been reused or repurposed for fraudulent activities, enabling the system to flag the communication as suspicious. Metadata of the submitted photo may be compared with that of examples available online at 606. A proportion of images matched between submission and online examples may be analyzed at 608. Deepfake detection may be applied to ascertain legitimacy of an image (i.e., computer-generated or enhanced) at 610. This process may involve analyzing the image for signs of manipulation or synthetic generation, such as inconsistencies in facial features, unnatural lighting, or pixel-level anomalies. If the system detects that the profile photo is entirely or partially fake, the system may strongly suggests that the associated profile is also fraudulent. Alternatively, if the image shows signs of manipulation, such as selective alterations or enhancements, this may indicate an attempt at deception. In either case, the system flags the image as potentially risky, further aiding in the identification of scam profiles. In some implementations and in some situations, not all of the foregoing operations are performed.

Figure 7:
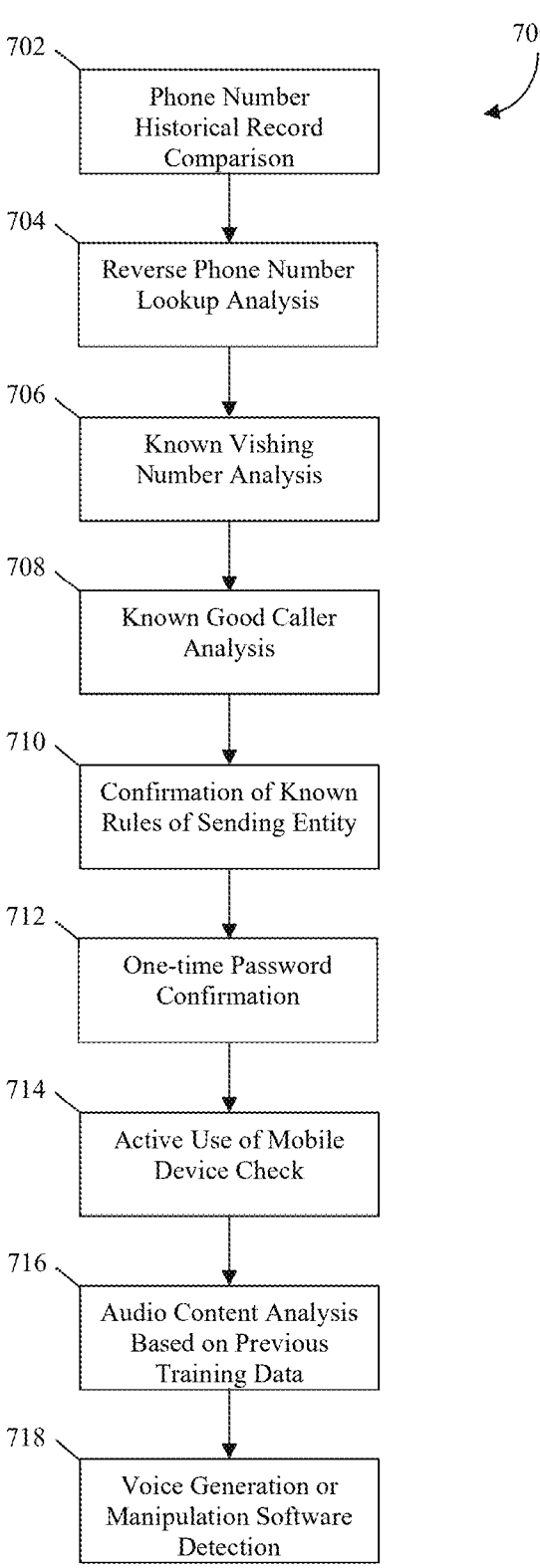
FIG. 7 illustrates an exemplary flow diagram of a decisioning process for a phone call, according to an aspect of the present invention.

Phone calls submitted to the validator subsystem may run through a decisioning process that includes operations that are suitable for analyzing potential scams in phone calls and depending on the attributes and data related to the phone call. FIG. 7 is a flow diagram of a decisioning process 700 for a phone call. A determination may be made whether the phone number is already in a historical database as a previously decisioned 'extreme risk' at 702. A reverse phone number lookup may be conducted to determine if the name matches that of the purported caller/caller's organization at 704. The phone number of a caller may be compared with a list of known vishing numbers (e.g., as stored in the system databases) at 706. The phone number may be compared with a list of known good callers (e.g., as stored in the system databases) at 708. A determination may be made whether the phone call complies with known contact rules of the purported sender (using an app on the user device) at 710. A determination may be made whether the user recently received a one-time passcode via SMS text (using the app) at 712. A determination may be made whether the user is presently on a call using their mobile device at 714. The audio content of the conversation is analyzed, utilizing artificial intelligence (e.g., NLP), and voice-to-text translation when necessary, to identify words, phrases, or other telltales indicative of a potential scam based on previously compiled 'training data' (e.g., as stored in the system databases) at 716. The system may compare the transcribed conversation against a database of previously compiled training data, including known legitimate and scam-related communications. By identifying specific words, phrases, or linguistic patterns indicative of fraudulent activity, the system may flag potential scams based on similarities to known scam conversations. The audio content of the conversation may be analyzed, utilizing artificial intelligence, to identify the use of voice generation or manipulation software at 718. This may involve identifying telltale signs of altered or artificially generated speech, which may suggest that the speaker is using voice-cloning technology or other manipulation tools to impersonate someone else. By combining voice-to-text analysis with audio manipulation detection, the system may provide a comprehensive assessment of both the content and authenticity of the conversation, helping to identify potential scams with greater accuracy. In some implementations and in some situations, not all of the foregoing operations are performed.

Figure 8:
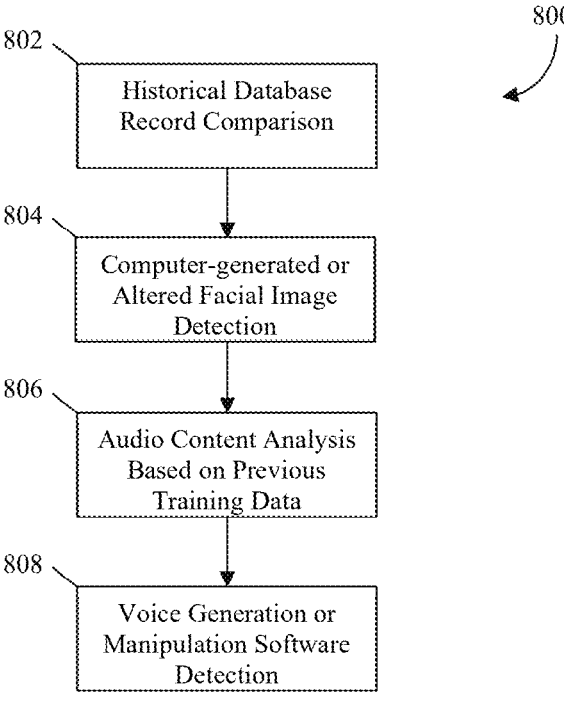
FIG. 8 illustrates an exemplary flow diagram of a decisioning process for a video call, according to an aspect of the present invention.

Video calls submitted to the validator subsystem may run through a decisioning process that includes operations that are suitable for analyzing potential scams in video calls and depending on the attributes and data related to the video call. FIG. 8 is a flow diagram of a decisioning process 800 for a video call. A determination may be made whether the phone number, email address, video caller username, or social media handle/profile is already in a historical database previously decisioned 'extreme risk' at 802. The video of the call may be analyzed, utilizing artificial intelligence, to identify the use of software designed to produce computer-generated or -altered facial images at 804. Algorithms may be used to identify defects or artifacts within the video, such as irregularities in lighting, unnatural facial movements, or pixel distortions, which are common indicators of manipulation or deepfake technology. Additionally, the system may look for known issues in facial images that are typical of deepfakes, such as mismatched lip-syncing or subtle inconsistencies in eye movement. The audio content of the conversation is analyzed, utilizing artificial intelligence, and voice-to-text translation when necessary, to identify words, phrases, or other telltales indicative of a potential scam based on previously compiled 'training data' (e.g., as stored in the system databases) at 806. The audio content of the conversation is analyzed, utilizing artificial intelligence, to identify the use of voice generation or manipulation software at 808.

Contextual information for use in analyzing communications may also be analyzed as part of the validation process (and/or the challenge process). For example, the user application associated with the system may be designed to glean data from the user's mobile device to collect and deliver signals for use during the analysis of user submissions. Text message attributes that may be harvested may include, for example, without limitation, if a message was received; a date the message was received; a time the message was received; if the message includes a string of numbers indicative of a one-time passcode; if the message includes a string of letters (e.g., uppercase) indicative of a one-time passcode; if the message includes terms that indicate the inclusion of a one-time passcode; and if the message was sent from a phone number known for delivering one-time passcodes. Phone call attributes that may be harvested include, for example, without limitation, if a phone call is in progress; and the time the phone call started.

The decisioning processes of FIGS. 3-8 may not be bound by a rigid, sequential order of operations. Instead, the system may dynamically route the communication or identity through various deterministic checks and probabilistic analyses based on the outcomes of preceding steps. For example, without limitation, if a category of the communication is determined to be romance, the system may prioritize additional analyses related to authenticating an identity of the counterparty before performing other checks, such as content analysis. Conversely, if a deterministic check, like verifying conformity with known communication policies, fails, the system might immediately escalate the communication to more stringent probabilistic models (e.g., an initial check identifies the presence of a known phishing link, a scam score of "high risk" may immediately be assigned to the communication). This nonsequential approach significantly enhances the speed and performance of the system by allowing the system to bypass unnecessary steps and focus only on the most relevant analyses. By dynamically routing the communication based on the results of each preceding step, the system reduces the time spent on low-risk or already validated aspects, thereby accelerating the overall process. Additionally, this flexibility minimizes computational overhead by directing resources to the most critical checks first, ensuring that the system can deliver accurate scam scores more quickly and efficiently, while also increasing its capacity to handle a higher volume of communications without compromising accuracy or thoroughness.

The scam challenger subsystem 110 may help users (e.g., a recipient of a call or message) determine if a counterparty (e.g., an originator of the call or message) in a communication is attempting to scam the user by establishing whether or not the counterparty is who they purport to be. This result is primarily achieved by soliciting identifying information from the counterparty as part of a communication initiated by the user either via text message or email message. The counterparty may be prompted to provide identifying information, which is subsequently compared with a variety of databases and is decisioned, or otherwise scored using a process designed to maximize efficiency (e.g., speed) without sacrificing accuracy or explainability. Each attribute must meet a specific threshold in order for the identity verification attempt to be approved. This approach ensures that key factors, such as document authenticity, consistency of personal information, or other relevant criteria, is independently assessed, with a failure in a critical attribute resulting in a possibility of rejection of the identity verification attempt. This method prioritizes accuracy and security by ensuring that every aspect of the identity may be thoroughly vetted. In the present embodiment, a rigid attribute-based approach may be applied. In another embodiment, an algorithmic scoring system may be used which may allow for greater flexibility and tunability, especially as criminal techniques evolve and become more sophisticated. The algorithmic model may also reduce false positives by assigning a weighted score to each attribute, rather than using an all-or-nothing approach. In addition, the counterparty may be advised of how the process is conducted, how the records that will be referenced, how the results will be stored, and to whom they will be disseminated so as to maintain compliance with applicable laws and regulations. The results of the analysis may be returned to the user in a privacy-preserving manner, such that the user may see if the counterparty agreed to participate, the information provided by the counterparty, whether or not that information matched queried databases, and other attributes that affect the risk associated with the counterparty. For example, without limitation, the user may see the counterparty's name, email address or phone number, and location used during the verification process. Any additional identity attributes accessed or used to render a decision may not be presented in clear text to the user, maintaining privacy and security. Instead of disclosing specific identity details, the system may reference non-personally identifiable information (non-PII) based indicators of risk. For example, the user may be notified of general risk factors such as "Association with known malicious activity" or "Evidence of user identity compromise." This approach ensures that users are informed of potential risks without exposing sensitive personal information, thereby balancing transparency with privacy. Recommendations may be provided to the user based on results from the scam challenger subsystem 110.

Figure 9:
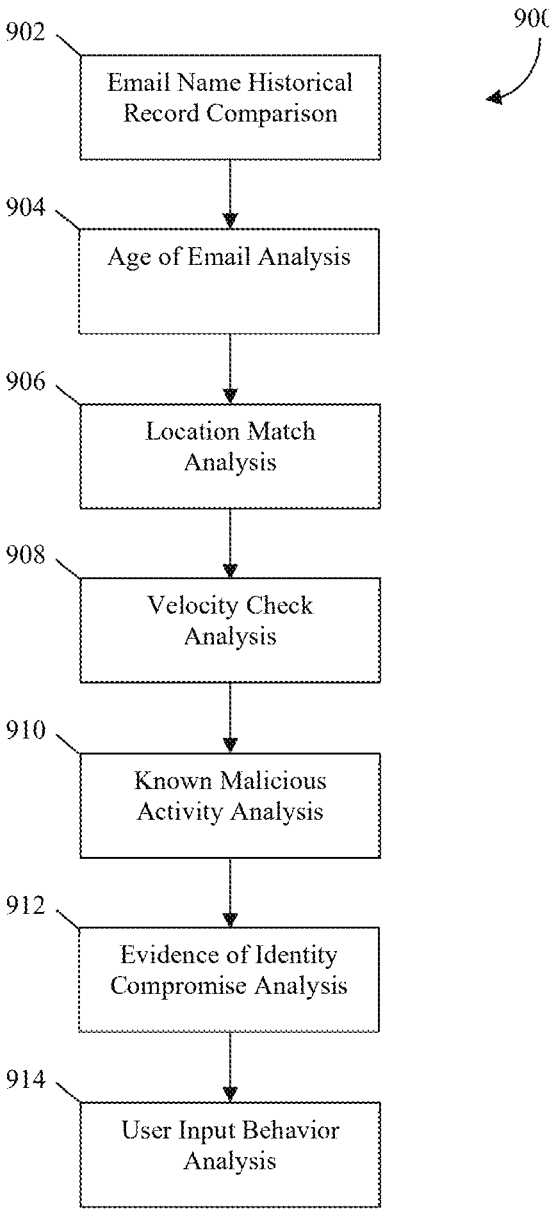
FIG. 9 illustrates an exemplary flow diagram of an identity analysis process for an email communication, according to an aspect of the present invention.

The scam challenger subsystem 110 may assess various elements to perform identity analysis. For emails, for example, the challenger subsystem 110 may verify attributes of the email or email address. FIG. 9 is a flow diagram of an identity analysis process 900 for an email communication. A determination may be made whether there is a name match with historical records at 902. An age of a 'primary' email address (e.g., more than half of all personal email addresses are at least 10 years old meaning that newer addresses are inherently less trustworthy), reported in years and months, may be identified at 904. A location match of the device from which the email originates is used to approve email verification (e.g., should match purported location) at 906. A velocity check (i.e., the frequency with which this email address is being submitted by users for verification or validation—higher frequency is less trustworthy), which may be reported as a number of submissions (e.g., over the last week or month), may be performed at 908. A check may be performed to determine whether there is an association of the email address with known malicious activity (e.g., whether confirmed cases of scams or fraud have been associated with this email address) at 910. A check may be performed for evidence of user identity compromise (e.g., whether this email address has been found compromised on the dark web, as part of a phishing campaign, or successful malware attack within the last 12 months) at 912. User input behavior when providing identifying information (e.g., scammers might display a degree of hesitancy not normally associated with legitimate respondent behavior) may be analyzed at 914. In some implementations and in some situations, not all of the foregoing operations are performed.

Figure 10:
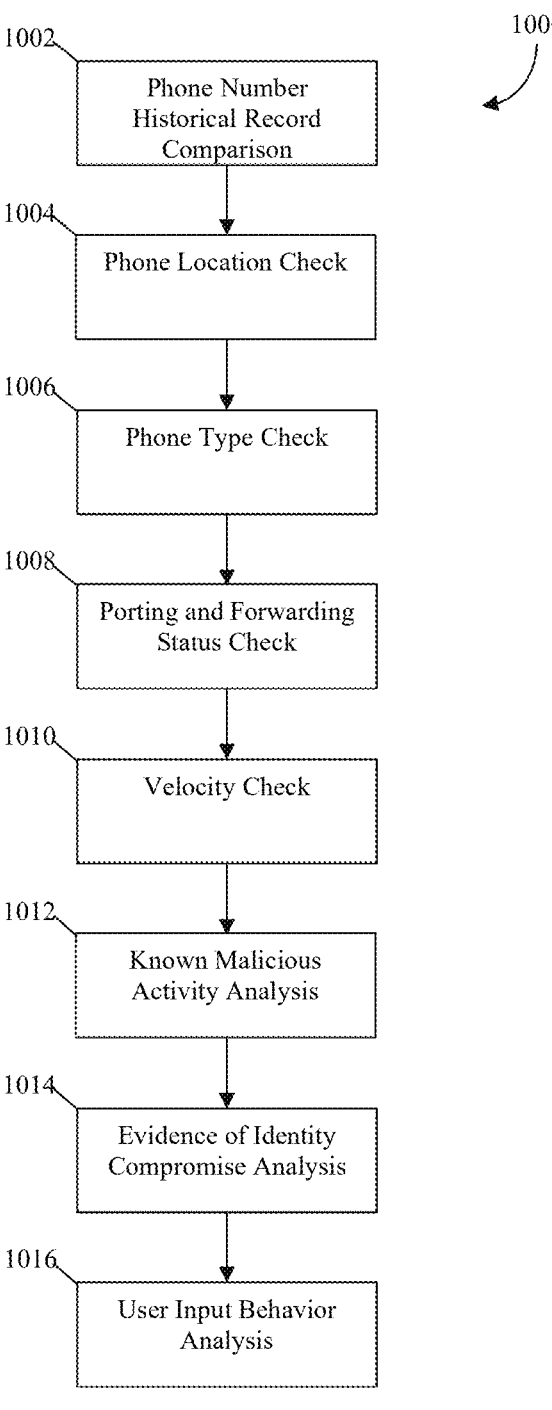
FIG. 10 illustrates an exemplary flow diagram of an identity analysis process for a phone number, according to an aspect of the present invention.

For phone numbers, the challenger subsystem may verify attributes of the phone number or incoming phone call. FIG. 10 is a flow diagram of an identity analysis process 1000 for a phone number. A check for a name match for the phone number or phone call with historical records may be performed at 1002. A location check of the phone (e.g., the state and/or country should match the purported location of the challenged party) may be performed at 1004. A phone type (e.g., landline, cellular, etc.—note that VoIP phones are high risk) may be checked at 1006. A porting and forwarding status (e.g., confirming whether or not messages and calls associated with this number are actually coming from/being directed to the phone enrolled with the carrier) for the phone number may be checked at 1008. Results may include, for example, no forwarding or porting active, or redirection active. A velocity check (i.e., the frequency with which this phone number is being submitted by users for verification or validation—higher frequency is less trustworthy), reported as a number of submissions over the last month, for example, may be performed at 1010. The phone number may be checked for an association with known malicious activity (e.g., whether confirmed cases of scams or fraud have been associated with this phone number) at 1012. The phone number may be checked for evidence of any user identity compromise (e.g., whether this phone number has been found compromised in a phishing attack within the last 12 months) at 1014. User input behavior when providing identifying information (e.g., scammers might display a degree of hesitancy not normally associated with legitimate respondent behavior) may be analyzed at 1016. In some implementations and in some situations, not all of the foregoing operations are performed.

In the event that the scam challenger subsystem 110 issues a decision that contradicts the purported identity of the counterparty, that counterparty may choose to submit additional documentation to dispute the decision. For example, when presented with the decision results from a completed validation process, which may be less detailed than those provided to the submitting user (e.g., simply indicating whether the purported identity matched that on record or if it failed), the counterparty may have alternative pathways for submitting evidence for disputing a decision. In particular, should a counterparty choose to dispute the results of validating the identity provided in association with a phone number or email address, the counterparty may choose to receive a validation message through whichever channel was not first used (i.e., if they failed validation via email, the counterparty may receive a text message at a number provided, and vice versa). Whichever new contact information the counterparty provides may be made available to the user (and that availability will be disclosed to the counterparty). The counterparty may also submit to a scan involving a form of government ID and facial recognition. For example, should a counterparty choose to dispute the results of validating their identity, the counterparty may choose to provide an image of their government issued identity document (i.e., driver's license or passport) along with a scan of their face to match the image on the identity document.

Biometric data in this case may be captured, transmitted, analyzed, and stored in accordance with all applicable laws and regulations. The biometric data may be collected in various forms: as a facial image using the device camera, as a voice sample using the device microphone, or as a fingerprint through an onboard reader. This data may be for verifying the identity of the individual presenting an ID document, as the biometric data can be directly compared to the information on the document to establish authenticity. Furthermore, the captured biometric data may be cross-referenced with a secure database to ensure that it corresponds with a previous entry associated with the same identity. This comparison helps to confirm the individual's identity while also checking that the biometric data is not linked to multiple identities in the database, thereby preventing instances of identity fraud. All processes involving biometric data may be conducted with strict adherence to relevant privacy laws and regulations to safeguard the rights and confidentiality of individuals. In some implementations, other pathways for proving identity may also be provided.

If the scam challenger process confirms the identity of the counterparty, a persistent software token may be embedded or otherwise delivered to the counterparty's device for future reference, thereby eliminating the need to complete the process in the future for any user. This token may be stored securely in the counterparty's device (e.g., in a digital wallet on a smartphone). Thus, users attempting to verify a previously verified party will result in the user being advised that the counterparty has been verified in the past and that the counterparty only need to agree to the process to move forward, at which point the token on their device may be used to cryptographically confirm their identity based on the original verification process.

Users may submit requests for validation or challenges through a user interface. To deliver maximum convenience and to empower users to act in the moment, multiple channels may be available for submitting a request to the challenger subsystem or the validator subsystem. For example, requests may be submitted via a software application associated with the system. The software application may be installed on a desktop or laptop computer, a tablet computer, a smartphone, or any other computing or communication device. Once the user has authenticated into the application, the user may choose to return to a communications app (email, text, etc.) to forward a message to the system, or the user may choose to continue to provide details in the application itself. Using a manual entry option, the user may type or copy-paste information about and/or received from the sender. Using a screenshot option, the user may input screenshots of communications with the sender which may be parsed via Optical Character Recognition (OCR). Through a text forwarding option, the user may forward a text message to the system (the contact information for which may be added to the user's contact phonebook upon app installation. Using an email forwarding option, the user may forward an email message to the system (the contact information for which may be added to the user's email address contact list upon app installation). Using an in-app sharing option, users may choose to long press share a message from any communications application with the application associated with the system. Using a plug-in sharing option, an application plug-in for the communication application may be selected to automatically share a message.

Users may also verify their own identity with the application to streamline the process of other users or parties verifying the users. In this case, the user may follow the same challenger process, choosing to be verified by phone or email. Should these channels fail, the user may be prompted to present a government-issued identity document and facial biometric for verification. Users may also choose to undergo the verification process utilizing their government-issued identity document and facial biometric to meet certain identity assurance levels, such as NIST Identity Assurance Level 3 (800-63B). Upon completing the verification process, a token may be bound to the user's device and the user may subsequently be asked to approve sharing the token with a counterparty if requested.

In some implementations, different potential scam communications may be combined in a single request. For example, the system may provide the ability for users to link new submissions to past submissions should they be from the same sender.

When reviewing multiple submissions as part of one case, users may be presented with the information submitted in each distinct instance and the results from each, as well as an overall summary of the interactions, including, for example, the date of the first submission, the date of the last submission, the total number of submissions, the number of submissions by score/risk level (low, medium, high, and extreme), and a complete list of all recommendations.

The system may also detect when a series of communications have been received from the same sender as identified, for example, by their phone number, email address, or social media handle (profile) within a predefined period of time. These communications may be analyzed and compared to previous series of known bad communications to identify potential commonalities that could indicate that a scam is being attempted.

In analyzing scams for validation and/or challenge purposes, the system may reference shared historical data (e.g., stored in one or more databases). The scam validator subsystem 105 and the scam challenger subsystem 110 may be configured to reference data points previously entered or generated during past submissions from either subsystem. Data from every submission may be encrypted and stored for categorization and later use. This shared historical data may be used, for example, to search for previously submitted: phone numbers and results, email addresses and results, photos and results, names and results, email messages and results, text messages and results, and social media messages and results, and to search for previously returned names (mismatched) and previously returned photos (mismatched).

The scam score is the unique output for each user submission. Based on the results of an analysis performed by the system, the score represents a level of scam risk inherent to each communication or identity being verified. This score may be generated through a comprehensive evaluation of the submission against a series of checks that assess both deterministic and probabilistic factors. Deterministic checks provide clear-cut results. For example, without limitation, if an attachment in a text message is linked to a known phishing site, or if the message violates an organization's established communication policies, the submission will receive a negative assessment. Conversely, the system also considers probabilistic factors, such as those derived from Natural Language Processing (NLP) analyses. While probabilistic checks may be less definitive, probabilistic checks may be used for identifying nuanced patterns and language use that may suggest fraudulent intent. For example, without limitation, if an email domain appears on a known good sender list, the email may serve as a positive indicator, but is not an absolute guarantee of legitimacy since even reputable senders can fall victim to compromises. As a submission progresses through the verification process, each stage may contribute to the overall scam score based on the outcomes of these checks. The accumulated results help determine whether the communication or identity has passed or failed at each evaluation point. Ultimately, the scam score may reflect an aggregate risk level, influenced by both the deterministic checks that yield definitive conclusions and the probabilistic assessments that capture more subtle cues of potential fraud. This layered scoring mechanism allows for a more nuanced understanding of scam risk, enabling users to make informed decisions based on the comprehensive analysis provided.

Risk levels may be defined, for example, as follows:

Low risk—The system is able to identify 'indicators of legitimacy' and is unable to identify any 'indicators of deception,' such that a scam is improbable.

Medium risk—The system is unable to identify 'indicators of legitimacy' of sufficient strength and/or is able to identify 'indicators of deception' that are not deemed severe, making a scam a distinct possibility.

High risk—The system is unable to identify 'indicators of legitimacy' and/or they are insufficient to overcome a meaningful number of 'indicators of deception' such that a scam is likely.

Extreme risk—The system is able to identify meaningful 'indicators of deception' (in number and/or severity) such that a scam is all but certain.

After performing the validation and/or challenge analysis, user recommendations may be presented as part of an attribute and/or disposition-based process. Recommendations may be provided to the user on the basis of two factors: the attributes analyzed during any interaction and the final disposition of analysis. Upon generation of the scam score, the system may reference a table that includes a set of recommendations specific to each score/risk level (low, medium, high, and extreme risk), as well as individual recommendations specific to each attribute and any associated findings. These recommendations may serve as actionable guidance for users, helping them to understand the implications of the scam score and how to respond appropriately based on the assessed risk. For instance, a low-risk score may suggest that the user can proceed with confidence, possibly accompanied by tips for maintaining good security practices. Conversely, a high-risk score may trigger warnings and suggest immediate steps such as verifying the sender's identity through an alternative channel or refraining from sharing sensitive information with the counterparty. In cases of extreme risk, the recommendations may include urgent actions like reporting the communication to authorities or completely blocking the sender. Furthermore, individual recommendations linked to specific attributes provide a deeper layer of context, allowing users to see which factors contributed to the overall risk assessment. For example, if the scam score was heavily influenced by the presence of a known phishing link, the user could be advised to avoid clicking on any links and to conduct further research on the purported sender. Accordingly, each and every user is provided with a set of recommendations that are tailored to that user's individual submission—appropriate to their situation and for the level of risk inherent to it. There is no artificial cap on the number of recommendations provided, rather that is a function of the number of operations completed in the algorithm may be used to render the disposition of their submission.

In addition to providing results to requesting users, results and the data analyzed to produce the results may be shared with a network of participating client organizations. This network may utilize connectivity between apps associated with the system, partner apps, and client systems to better identify malicious actors and activities. The system apps may capture data upon rendering final disposition. All data may be secured in storage and transmission. Permissions to access the underlying data vary depending on party and in accordance with all government regulations and laws. For example, without limitation, available data types and eligible receiving party may include confirmed scammer names (all parties, as disclosed in the challenger subsystem terms and conditions to a verified party); confirmed scammer phone numbers (all parties); disposition of scammer phone (e.g., risk indicator results, clients only); confirmed scammer email addresses (all parties); disposition of scammer email address (e.g., risk indicator results, clients only); confirmed scammer ancillary identifiers (e.g., social media handles, clients only); confirmed scammer account details (e.g., ABA/account #, wallet address, etc., clients only); targeted victims' names (Servicing financial institution, insurer, or government agency participating in the network); targeted victims' phone numbers (Servicing financial institution, insurer, or government agency participating in the network); targeted victims' email addresses (Servicing financial institution, insurer, or government agency participating in the network); targeted victims' scam histories (Servicing financial institution, insurer, or government agency participating in the network) and partner data sourced from partners (e.g., participating client organizations or other third party data sources) directly.

All data may be secured in storage and transmission. Permissions to access the underlying data vary depending on party and in accordance with all government regulations and laws. Potential partner data types (eligibility of receiving parties determined by partners) may include, for example, without limitation confirmed scammer IP address; confirmed scammer geo-location; confirmed scammer device ID; confirmed scammer linked names; confirmed scammer linked financial accounts; confirmed scammer linked ancillary identifiers; confirmed scammer linked device IDs; confirmed scammer linked phone numbers; and confirmed scammer linked email addresses.

Figure 11:
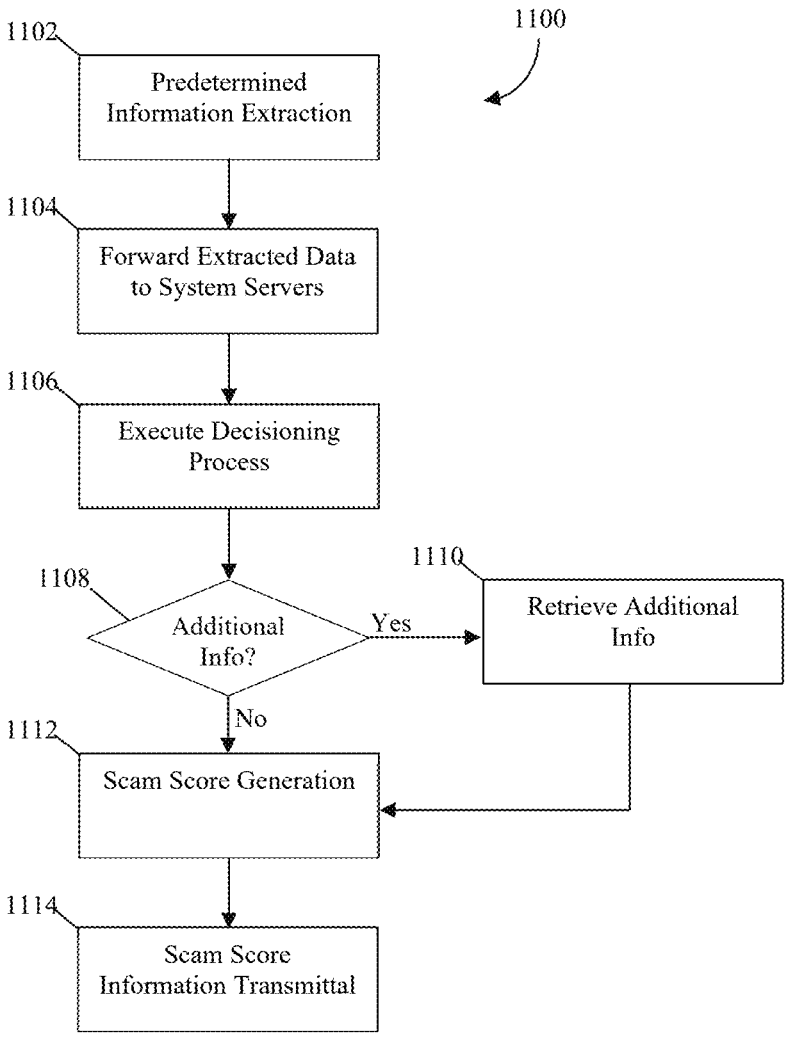
FIG. 11 illustrates an exemplary flow diagram of a scam detection process using a scam monitoring app and plug-in, according to an aspect of the present invention.

FIG. 11 is a flow diagram of scam detection process 1100 using a scam monitoring app and plug-in installed on a user device. The scam monitoring app may be associated with the system 200 of FIG. 2 and may rely on communications with the system servers to obtain scam-related data and analyses. The plug-in may also be associated with system 200 of FIG. 2 and may interface with a communication application (e.g., an email or browser application) on the user device to enable system 200 to access data related to messages and other communications sent and received by the communication application, to display notifications in the communication application (e.g., scam alerts), and to allow users to set preferences related to how system 200 interacts with the communication application (e.g., risk threshold for pop-up notifications and automated disposition of messages identified as high risk). Although the following discussion relates to received messages, the techniques are equally applicable to other data that is received (e.g., images, downloaded documents, retrieved webpages, and telephone calls).

When a message is received by the communication application, the plug-in extracts predetermined information from the message at 1102. For example, the extracted information may not include the entire message but may include data that is needed to adequately analyze whether the message likely represents a scam. The plug-in forwards the extracted data to the system servers, directly or through the installed scam monitoring app at 1104. In cases where the user grants the system authenticated access to the user's communication accounts, information may be extracted directly by the system rather than needing a plug-in to forward extracted information. Scam detector subsystem 205 may execute a decisioning process (e.g., as discussed in connection with FIGS. 3-8) based on a predetermined order of algorithmic operations at 1106. The predetermined order may, in some implementations, be different depending on attributes of the message. For example, if a message matches previously decisioned malicious activity, the number of additional operations and their sequence may be different than if the message does not contain such content. The decisioning process may be performed based on data stored in data warehouse 225. In some embodiments, data may need to be retrieved from external vendors 230 or 250 (e.g., for certain LLM functions, for accessing financial institution data, or for accessing external sources to search for known scams). Additional data may also need to be retrieved from the user, for example, if information regarding keystrokes or the like is not automatically included in the extracted information received at 1104 and is determined to be needed for the decisioning process. Other types of additional data may be needed from the user. Accordingly, a decision is made at 1108 whether external data is needed. If so, the external data is retrieved at 1110 (e.g., using APIs that interface with the external systems) before completing the decisioning process.

Based on the outcome of each algorithmic operation in the decisioning process, a "scam" score is determined representing a risk that the message is an attempted scam at 1112. The score may be determined, for example, by assigning a risk level indicator value to the outcome of each algorithmic operation and weighting the risk level indicator values according to predetermined weight values, as stored in data warehouse 225 or in scam detector subsystem 205. The weight values may be different, in some implementations, depending on which and how many algorithmic operations are performed, or based on specific attributes of the message. The system may send the scam score, a warning notification, and/or information regarding which factors most contributed to the scam score to the user device at 1114. The scam score and related data may be sent to the scam monitoring app on the user device, the plug-in, or both. For example, notifications of high-risk messages may be sent to the plug-in for immediate display to the user and also sent to the installed scam monitoring app to provide the user access to a historical record.

The scam validator process is similar to the scam detection process of FIG. 11, except that the scam validator process may not be automatically initiated by the plug-in for incoming messages. Instead, the scam validator process may be initiated by a user through the scam monitoring app (or through a web page) submitting a message or contact information to the system. In some implementations, the scam validator process may also use a different set of algorithmic operations and/or weight values in generating a scam score.

Figure 12:
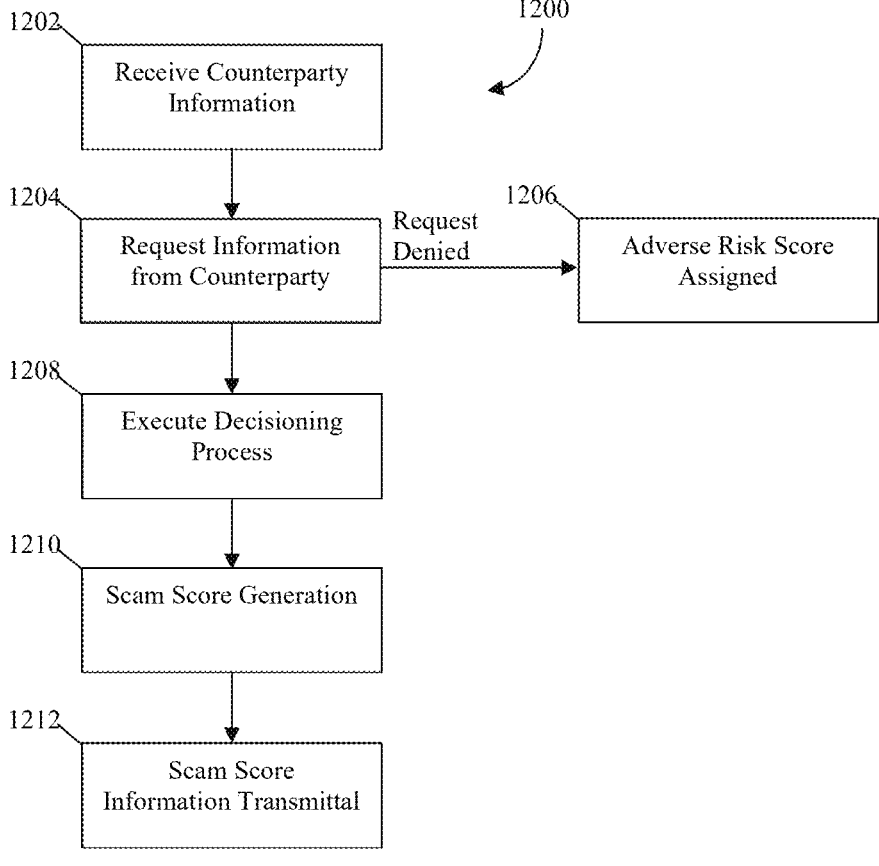
FIG. 12 illustrates an exemplary flow diagram of a scam challenger process using a scam monitoring app, according to an aspect of the present invention.

FIG. 12 is a flow diagram of scam challenger process 1200 using a scam monitoring app installed on a user device. Scam challenger process 1200 may be initiated as a result of a scam score that exceeds a particular threshold or based on a user providing contact information for a counterparty to the system. Typically, however, scam challenger process 1200 is not initiated without authorization by the user. The counterparty's contact information, as entered by the user or as extracted from a message, may be submitted to scam challenger subsystem 215 at 1202. Scam challenger subsystem 215 may send a message to (or call) the counterparty requesting that the counterparty provide selected personal information at 1204. If the counterparty refuses to provide their information, the process terminates at 1206 and the counterparty may be assigned an adverse risk score. If the counterparty agrees and provides the requested personal information, scam challenger subsystem 215 may execute a decisioning process (e.g., as discussed in connection with FIGS. 9-10) at 1208. The decisioning process may involve comparing the attributes of the personal information provided by the counterparty with information that has been previously stored in data warehouse 225 or that is available through third-party records and historical databases accessed from vendors or partners through APIs or other connections to external systems. Based on the degree of matching, scam challenger subsystem 215 may generates a scam risk score at 1210, similar to the score generated by scam detection subsystem 205. For example, the scam risk score may be generated by executing the decisioning process in a predetermined order, which may vary depending on the collected attributes, assigning risk indicator values based on the analysis of the counterparty's personal information, and combining the risk indicator values according to weights. The system may send the scam score, the personal information provided by the counterparty, and information regarding which factors most contributed to the scam score to the user device at 1212. The scam score and related data may be sent to the scam monitoring app on the user device.

Figure 13:
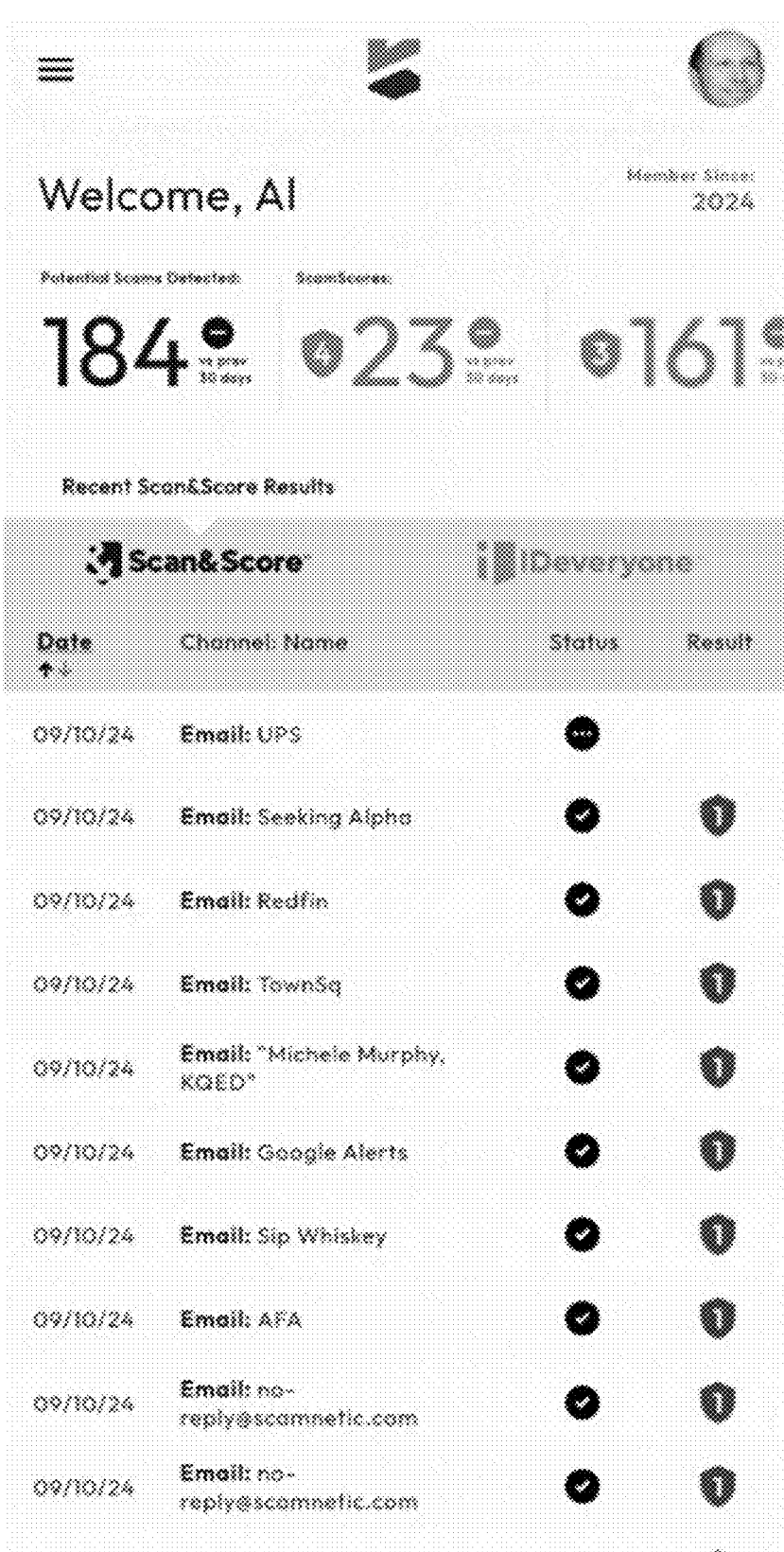
FIG. 13 illustrates an exemplary illustration of a user interface display home screen, according to an aspect of the present invention.

FIG. 13 is an illustration of a user interface display home screen for the scam monitoring app on a user device. The home screen displays overview statistics regarding completed scans and scam scores, along with a status of and scam score for each automatically or manually initiated scan.

Figure 14:
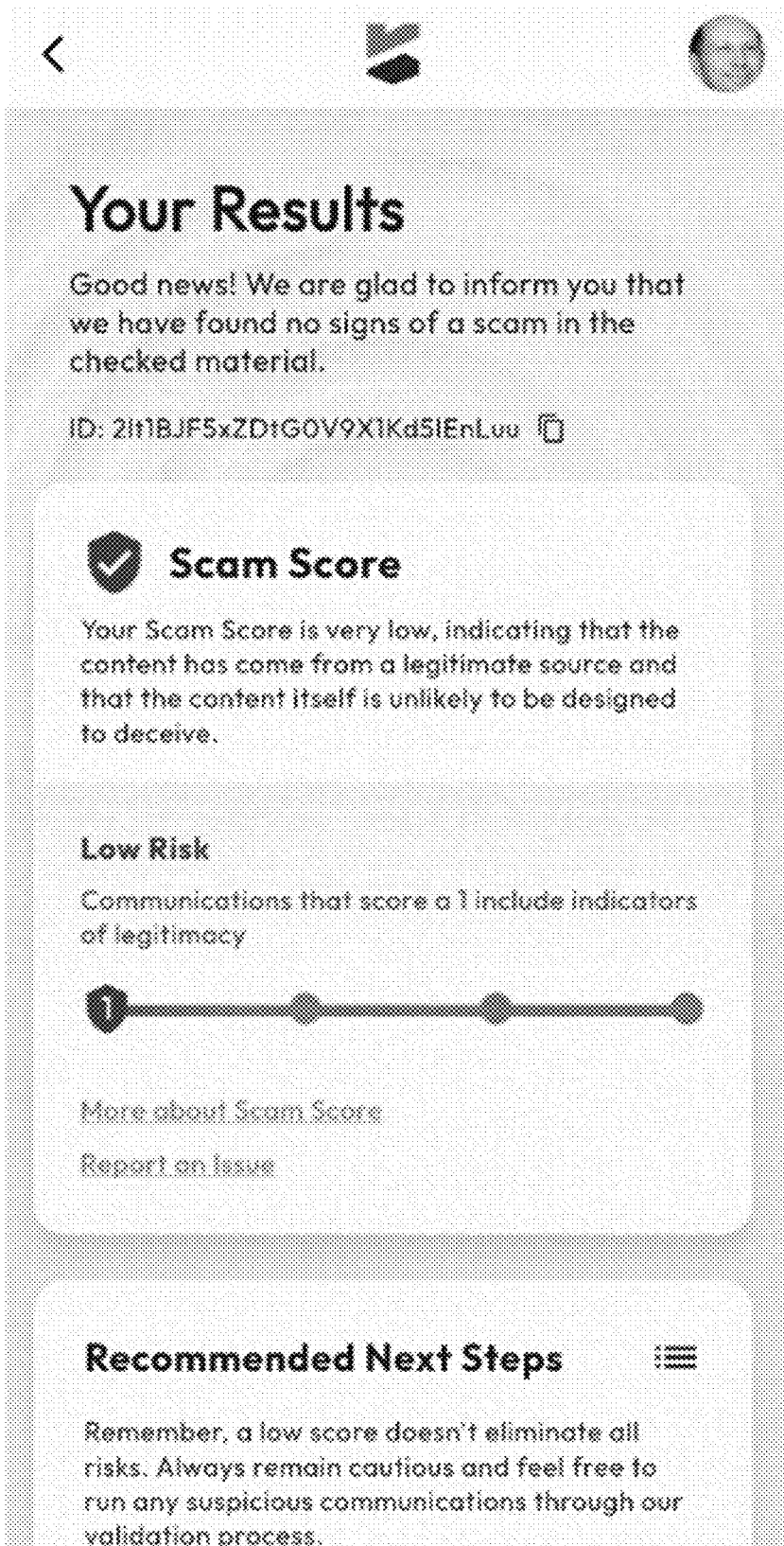
FIG. 14 illustrates an exemplary illustration of a user interface display low-risk result screen, according to an aspect of the present invention.

FIG. 14 is an illustration of a user interface display low-risk result screen for the scam monitoring app on the user device. The low-risk result screen provides a user with reassurance that the message does not have significant scam risk indicators.

Figure 15:
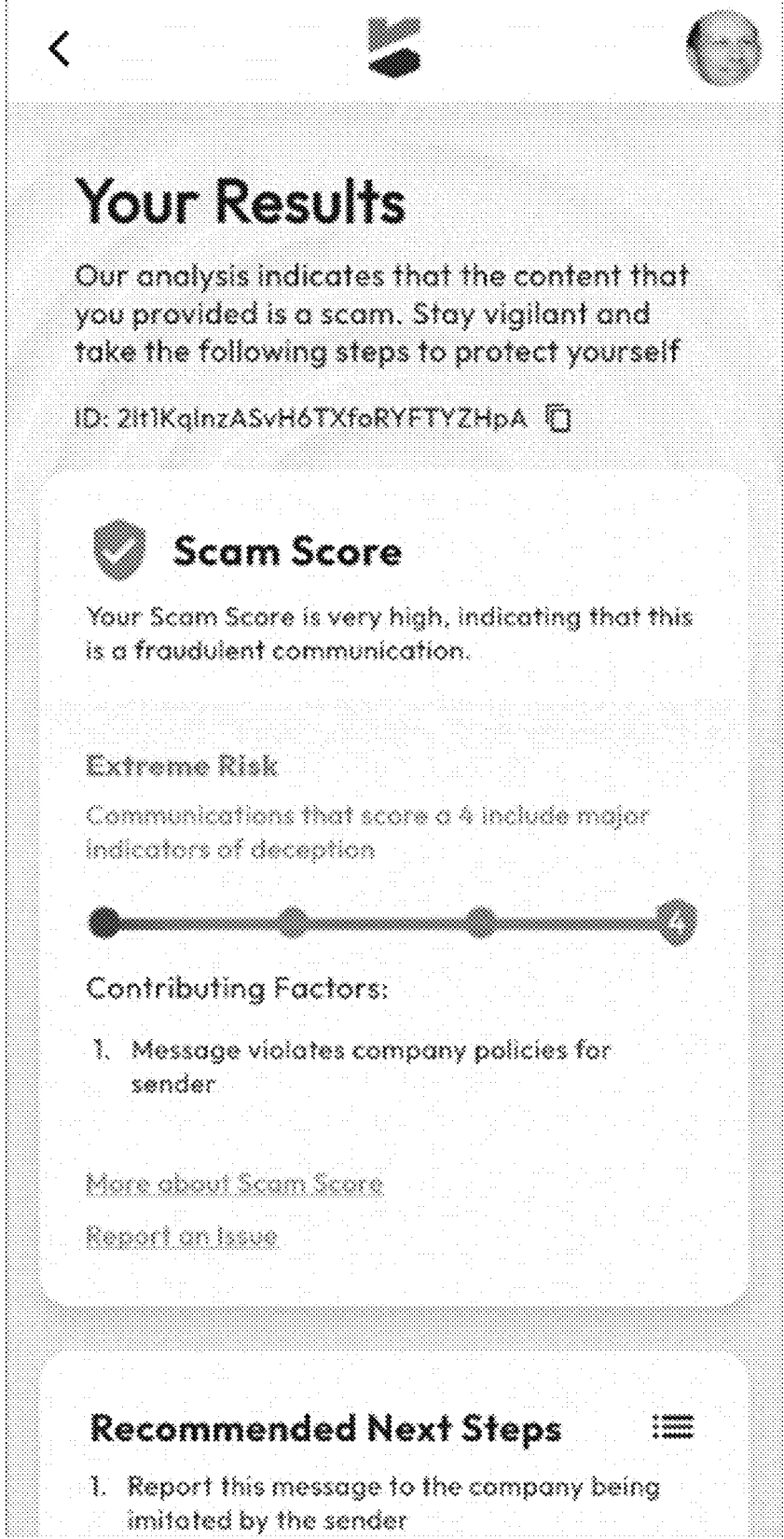
FIG. 15 illustrates an exemplary illustration of a user interface display high-risk result screen, according to an aspect of the present invention.

FIG. 15 is an illustration of a user interface display high-risk result screen for the scam monitoring app on the user device. The high-risk result screen provides a user with a scam risk score along with a summary of factors that contributed to the message being assessed as a high scam risk.

Figure 16:
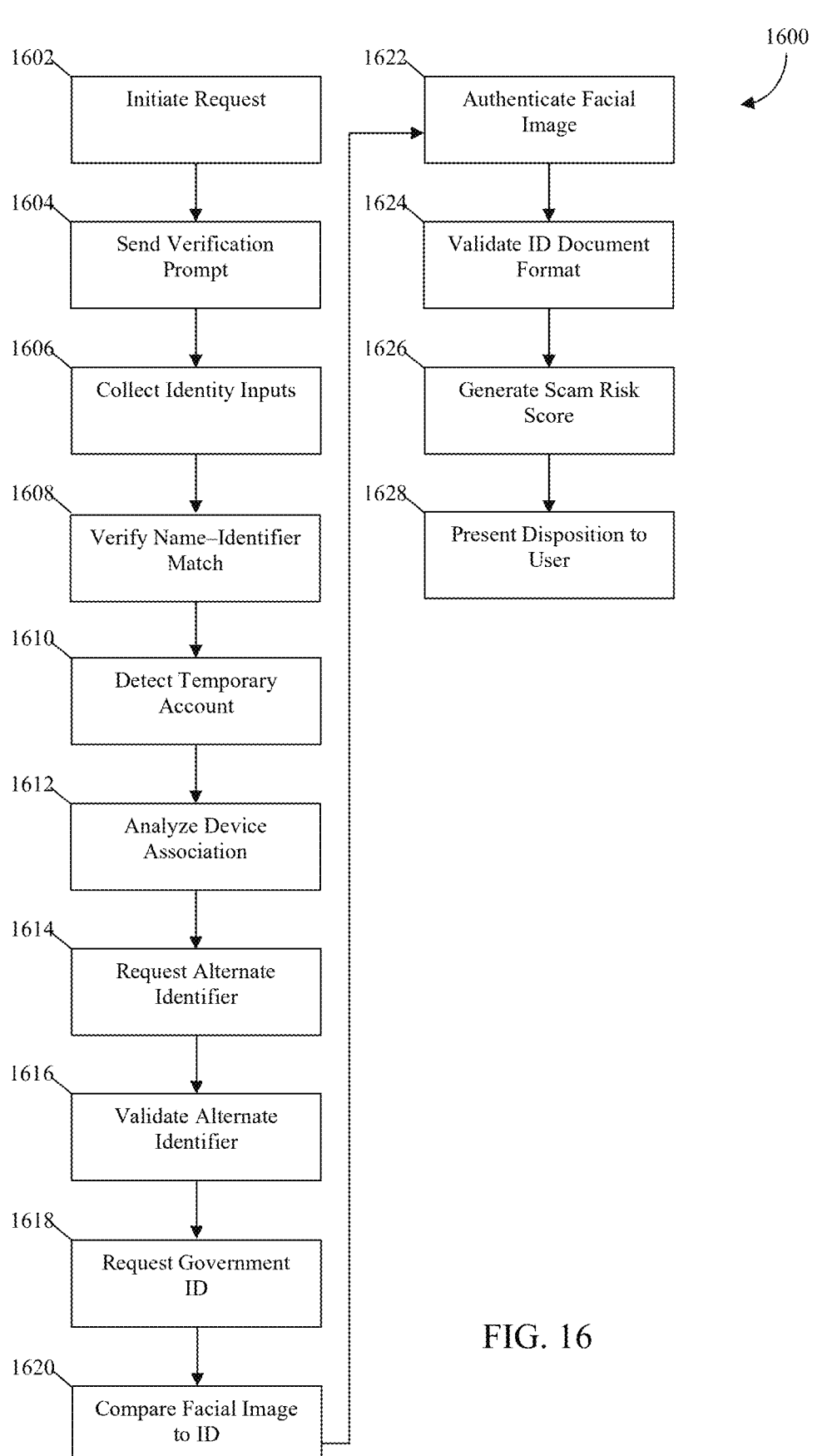
FIG. 16 illustrates an exemplary flow diagram of a person-initiated identity validation process performed by the scam validator subsystem, according to aspects of the present disclosure.

FIG. 16 illustrates an exemplary flow diagram of a person-initiated identity validation process performed by the scam validator subsystem, according to aspects of the present disclosure. At step 1602, process 1600 is initiated when a user enters the contact information (e.g., phone number, email, etc.) of a party to be confirmed into the application. At step 1604, the scam validator subsystem transmits a communication—such as a text message or email—to the party being verified, prompting consent to participate and agreement to applicable terms and conditions.

At step 1606, upon receipt of consent, the scam validator subsystem collects identifying information from the responding party, including the party's full name and an approximate physical location (e.g., country and postal code). At step 1608, the subsystem confirms whether the submitted name is associated with the provided email address or phone number, including assessing the length of such association based on historical records.

At step 1610, the subsystem determines whether the email address or phone number is indicative of a temporary account by identifying the provider and, in some cases, issuing a real-time status query to determine whether the channel is associated with a one-time-use service or disposable identity. At step 1612, the scam validator subsystem inspects the device's technical indicators, such as device fingerprint and geolocation, and correlates these with stored historical patterns to determine whether the responding device exhibits a positive and persistent association with the submitted identifier. This technical inspection allows the system to establish whether the responding party is in control of a device that has been long associated with the purported identity.

If the results of the initial checks are inconclusive, the process may proceed to step 1614, in which the subsystem prompts the party to submit an alternative contact point, such as a phone number if the original submission involved an email address, or vice versa. At step 1616, the system analyzes the supplementary identifier using a sequence of validation operations similar to those described above.

If the supplementary checks remain inconclusive, the process may escalate at step 1618, wherein the scam validator subsystem initiates a biometric identity proofing process. This process may include requesting a government-issued identity document along with a user-submitted facial image of the party being verified. At step 1620, the system compares the facial image to the image on the submitted identity document to evaluate whether the two match. At step 1622, the facial image is evaluated for manipulation, such as deepfake artifacts or structural inconsistencies indicative of alteration. At step 1624, the document is examined for conformance with jurisdiction-specific standards, including font types, layout structures, holographic markers, and other anti-fraud features.

At step 1626, based on the results of the layered analysis described above, the scam validator subsystem generates a scam risk score and produces a disposition report. At step 1628, the disposition report is presented to the requesting user, identifying whether the party could be confirmed, providing reasons for any failure, and offering recommendations tailored to the assessed level of risk.

The process may also be initiated by an institution—such as a financial institution or government entity—when a high-risk transaction is attempted. In such cases, the institution may pause the transaction and utilize the scam validator subsystem to verify the identity of a non-customer recipient before resuming the activity.

This process constitutes a specific and non-conventional improvement over legacy identity proofing systems. Unlike traditional frameworks which operate within closed institutional environments where the verifying entity has direct access to proprietary customer records and legally binding relationships, the present system enables decentralized, peer-initiated identity verification in contexts where no such institutional authority exists. The system introduces technical mechanisms to resolve identity uncertainty under these constraints through layered, fallback-driven analysis and integration of heterogeneous signals such as device telemetry, metadata age, temporary channel detection, and biometric matching.

The scam validator subsystem thus improves the functioning of communication security technologies by enabling trustworthy verification in previously unsupported person-to-person interactions. These improvements rely on specific technical implementations—such as dynamic routing of verification stages based on signal quality, and escalation to biometric identity analysis only when earlier deterministic checks fail—thereby enhancing accuracy, scalability, and trust without reliance on traditional centralized infrastructures.

Implementations of the subject matter and the functional operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer program products, i.e., one or more modules of computer program instructions tangibly stored on a computer readable storage device for execution by, or to control the operation of, data processing apparatus. In addition, the one or more computer program products may be tangibly encoded in a propagated signal, which is an artificially generated signal, e.g., a machine-generated electrical, optical, or electromagnetic signal, that is generated to encode information for transmission to suitable receiver apparatus for execution by a computer. The computer readable storage device may be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus may employ various different computing model infrastructures, such as web services, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, mobile device, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory may be supplemented by, or incorporated in, special purpose logic circuitry.

To provide for interaction with a user, implementations of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations of the subject matter described in this specification may be implemented in a computing system that includes a backend component, e.g., as a data server, or that includes a middleware component, e.g., an application server, or that includes a front end component, e.g., a client computer having a graphical user interface or a Web browser through which a user may interact with an implementation of the subject matter described is this specification, or any combination of one or more such backend, middleware, or front end components. The components of the system may be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the invention have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present Although the present disclosure and its advantages have been described in detail, it should be understood that various changes, substitutions and alterations may be made herein without departing from the technology of the disclosure as defined by the appended claims. For example, relational terms, such as "above" and "below" and/or "inside" and "outside" are used with respect to a specific device. Of course, if the device is inverted, above becomes below, and vice versa. Additionally, if oriented sideways, above and below may refer to sides of a device. Further, reference to "first" or "second" instances of a feature, element, or device does not indicate that one device comes before or after the other listed device. Reference to first and/or second devices merely serves to distinguish one device that may be similar or similarly referenced with respect to another device.

Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The description of the disclosure is provided to enable any person skilled in the art to make or use the disclosure. Various modifications to the disclosure will be readily apparent to those reasonably skilled in the art, and the generic principles defined herein may be applied to other variations without departing from the spirit or scope of the disclosure. Thus, the present disclosure is not intended to be limited to the examples and designs described herein but is to be accorded the widest scope consistent with the principles and novel features disclosed herein. Accordingly, the disclosure is not to be limited by the examples presented herein, but is envisioned as encompassing the scope described in the appended claims and the full range of equivalents of the appended claims.

What is claimed is:

1. A system for verifying an identity of a counterparty, the system comprising:
one or more processors; and
memory storing instructions that, when executed by the one or more processors, cause the system to perform operations comprising:
receiving identifying information for the counterparty provided by a user, the identifying information comprising at least one of an email address or a phone number;

transmitting a consent prompt to the counterparty via a communication channel associated with the identifying information wherein the consent prompt comprises a prompt for the counterparty to consent in a identification validation process initiated by the user;
receiving, from the counterparty, consent to participate in an identity verification process and additional identity data comprising a full name and an approximate geographic location;
determining whether the full name is historically associated with the identifying information;
determining whether the identifying information is associated with a temporary account by identifying a service provider associated with the identifying information and querying a status of the account;
analyzing a device fingerprint of a device used by the counterparty and correlating the fingerprint with historical records linked to the identifying information;
generating a scam risk score based on results of the determining and analyzing operations; and
presenting the scam risk score and one or more recommendations to the user based on the scam risk score;
wherein the scam risk score is calculated by aggregating weighted values assigned to results of individual verification operations.

2. The system of claim 1, wherein the memory further stores instructions that, when executed, cause the system to perform operations comprising:
in response to an inconclusive result from the determining or analyzing operations, requesting a secondary communication identifier from the counterparty; and
repeating the determining and analyzing operations with respect to the secondary communication identifier.

3. The system of claim 2, wherein the secondary communication identifier comprises a phone number and the initially submitted identifying information comprises an email address.

4. The system of claim 2, wherein the secondary communication identifier comprises an email address and the initially submitted identifying information comprises a phone number.

5. The system of claim 2, wherein the scam risk score is updated based on results of the determining and analyzing operations performed on the secondary communication identifier.

6. The system of claim 2, wherein the memory further stores instructions that, when executed, cause the system to perform operations comprising:
in response to an inconclusive result after analysis of both the primary and secondary communication identifiers, requesting a government-issued identity document and a live facial image of the counterparty.

7. The system of claim 6, wherein the memory further stores instructions for:
comparing the live facial image to an image extracted from the government-issued identity document;
detecting anomalies in the live facial image indicative of manipulation; and
evaluating formatting characteristics of the government-issued identity document for conformity with document standards of an issuing authority.

8. The system of claim 7, wherein the scam risk score is further based on results of the comparing, detecting, and evaluating operations performed on the live facial image and the identity document.

9. The system of claim 1, wherein the device fingerprint comprises one or more of: a hardware identifier, an operating system attribute, and a geolocation indicator.

10. A method for verifying an identity of a counterparty, the method comprising:

receiving, by a system comprising one or more processors and a memory, identifying information for the counterparty provided by a user, the identifying information comprising at least one of an email address or a phone number;

transmitting a consent prompt to the counterparty via a communication channel associated with the identifying information wherein the consent prompt comprises a prompt for the counterparty to consent in a identification validation process initiated by the user;

receiving, from the counterparty, consent to participate in an identity verification process and additional identity data comprising a full name and an approximate geographic location;

determining whether the full name is historically associated with the identifying information;

determining whether the identifying information is associated with a temporary account by identifying a service provider associated with the identifying information and querying a status of the account;

analyzing a device fingerprint of a device used by the counterparty and correlating the fingerprint with historical records linked to the identifying information;

generating a scam risk score based on results of the determining and analyzing operations; and presenting the scam risk score and one or more recommendations to the user based on the scam risk score;

wherein the scam risk score is calculated by aggregating weighted values assigned to results of individual verification operations.

11. The method of claim 10, further comprising:

in response to an inconclusive result from the determining or analyzing operations, requesting a secondary communication identifier from the counterparty; and repeating the determining and analyzing operations with respect to the secondary communication identifier.

12. The method of claim 11, wherein the secondary communication identifier comprises a phone number and the initially submitted identifying information comprises an email address.

13. The method of claim 11, wherein the secondary communication identifier comprises an email address and the initially submitted identifying information comprises a phone number.

14. The method of claim 11, further comprising updating the scam risk score based on results of the determining and analyzing operations performed on the secondary communication identifier.

15. The method of claim 11, further comprising:

in response to an inconclusive result after analysis of both the primary and secondary communication identifiers, requesting a government-issued identity document and a live facial image of the counterparty.

16. The method of claim 15, further comprising:

comparing the live facial image to an image extracted from the government-issued identity document;

detecting anomalies in the live facial image indicative of manipulation; and evaluating formatting characteristics of the government-issued identity document for conformity with document standards of an issuing authority.

17. The method of claim 16, further comprising updating the scam risk score based on results of the comparing, detecting, and evaluating operations performed on the live facial image and the identity document.

18. The method of claim 10, wherein the device fingerprint comprises one or more of: a hardware identifier, an operating system attribute, and a geolocation indicator.

\* \* \* \* \*